United States Patent [19]

Takeda

[11] Patent Number: 5,062,402
[45] Date of Patent: Nov. 5, 1991

[54] KNOCKING CONTROL APPARATUS OF INTERNAL COMBUSTION ENGINE

[75] Inventor: Yuji Takeda, Toyota, Japan

[73] Assignee: Toyota Jidosha Kabushiki Kaisha, Toyota, Japan

[21] Appl. No.: 565,580

[22] Filed: Aug. 9, 1990

[30] Foreign Application Priority Data

Aug. 10, 1989 [JP] Japan .................. 1-207251
Aug. 30, 1989 [JP] Japan .................. 1-223466

[51] Int. Cl.$^5$ ............................................. F02P 5/14
[52] U.S. Cl. .................................................. 123/425
[58] Field of Search ............. 123/425, 435, 417, 419; 73/35; 364/550, 551, 506, 431.08

[56] References Cited

U.S. PATENT DOCUMENTS

| 4,334,422 | 1/1982 | Kawai et al. ...................... 73/35 |
| 4,840,158 | 6/1989 | Komurasaki .................... 123/419 |
| 4,858,580 | 8/1989 | Kamira et al. ................... 123/425 |
| 4,895,121 | 1/1990 | McCoy et al. ................... 123/425 |
| 4,928,652 | 5/1990 | Shinya et al. ................... 123/417 |

FOREIGN PATENT DOCUMENTS

| 58-28645 | 2/1983 | Japan ................... 123/425 |
| 58-135435 | 8/1983 | Japan ................... 123/425 |
| 60-08731 | 1/1985 | Japan ................... 123/425 |
| 60-19964 | 2/1985 | Japan ................... 123/425 |
| 60-27834 | 2/1985 | Japan ................... 123/425 |
| 60-27835 | 2/1985 | Japan ................... 123/425 |
| 60-30473 | 9/1985 | Japan ................... 123/425 |
| 63-253155 | 10/1988 | Japan ................... 123/425 |
| 01-116283 | 5/1989 | Japan ................... 123/425 |
| 01-117987 | 5/1989 | Japan ................... 123/425 |

Primary Examiner—Raymond A. Nelli
Attorney, Agent, or Firm—Kenyon & Kenyon

[57] ABSTRACT

An engine which determines the occurrence of knocking using the maximum frequency point, which expresses the maximum strength of vibration which occurs with the highest frequency in the engine. The maximum frequency point is updated in accordance with the engine operating conditions. That is, a first region of a fixed width is set at the larger side of the strength of vibration of the maximum frequency point and the maximum frequency point is increased by a fixed value when the maximum strength of vibration occurring in the engine is in that first region. On the other hand, a second region of a fixed width is set at the smaller side of the strength of vibration of the maximum frequency point and the maximum frequency point is decreased by a fixed value when the maximum strength of vibration occurring in the engine is in that second region.

27 Claims, 23 Drawing Sheets

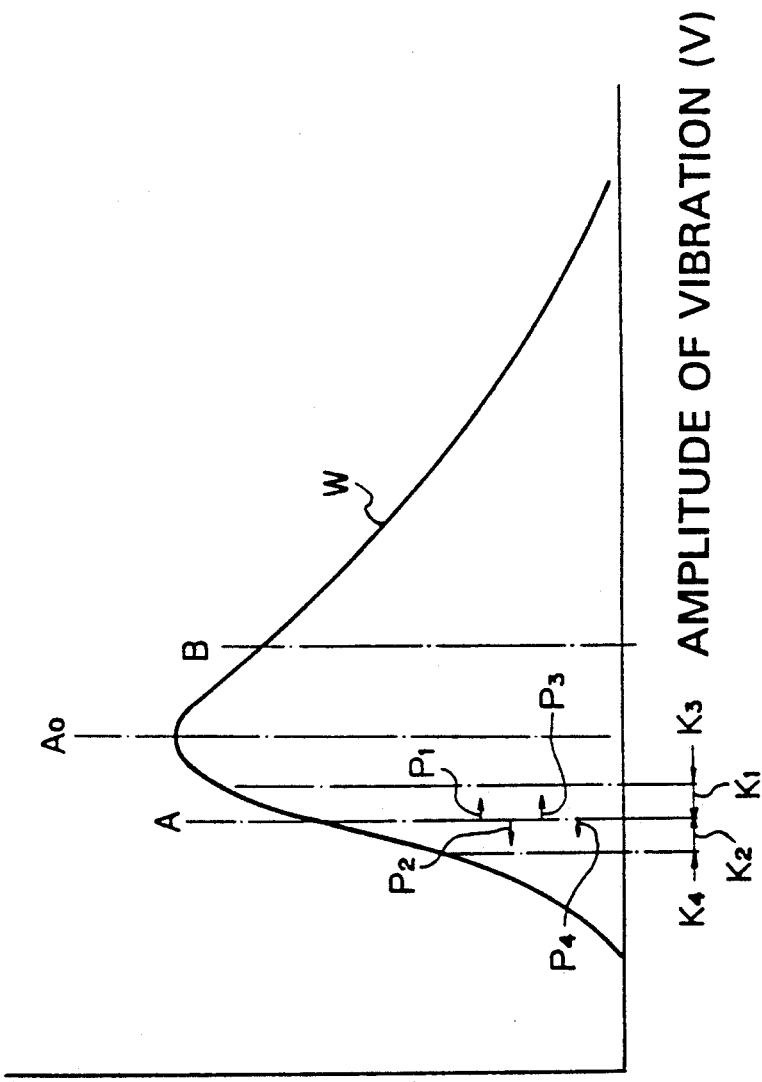

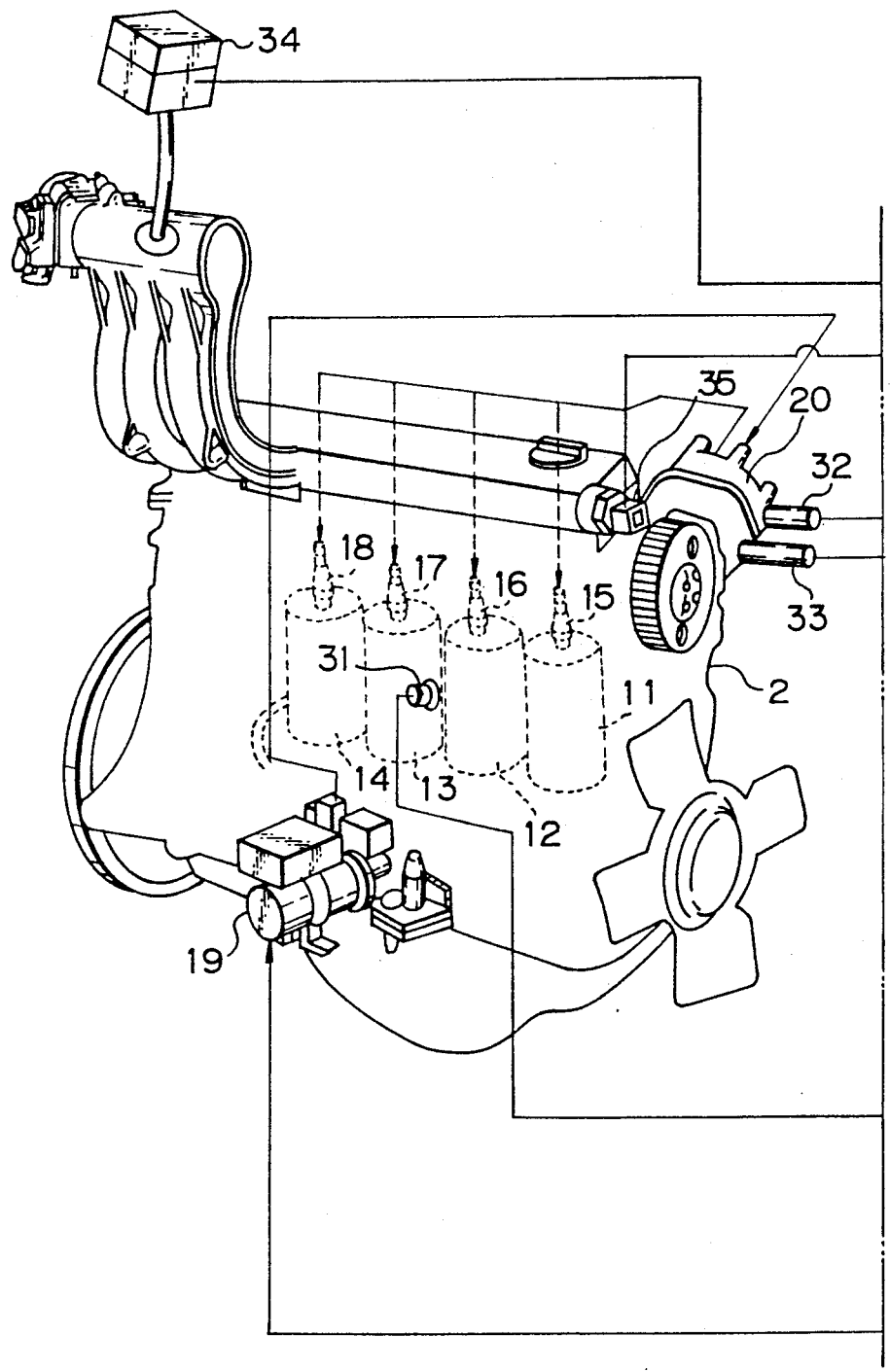

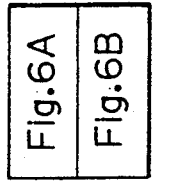
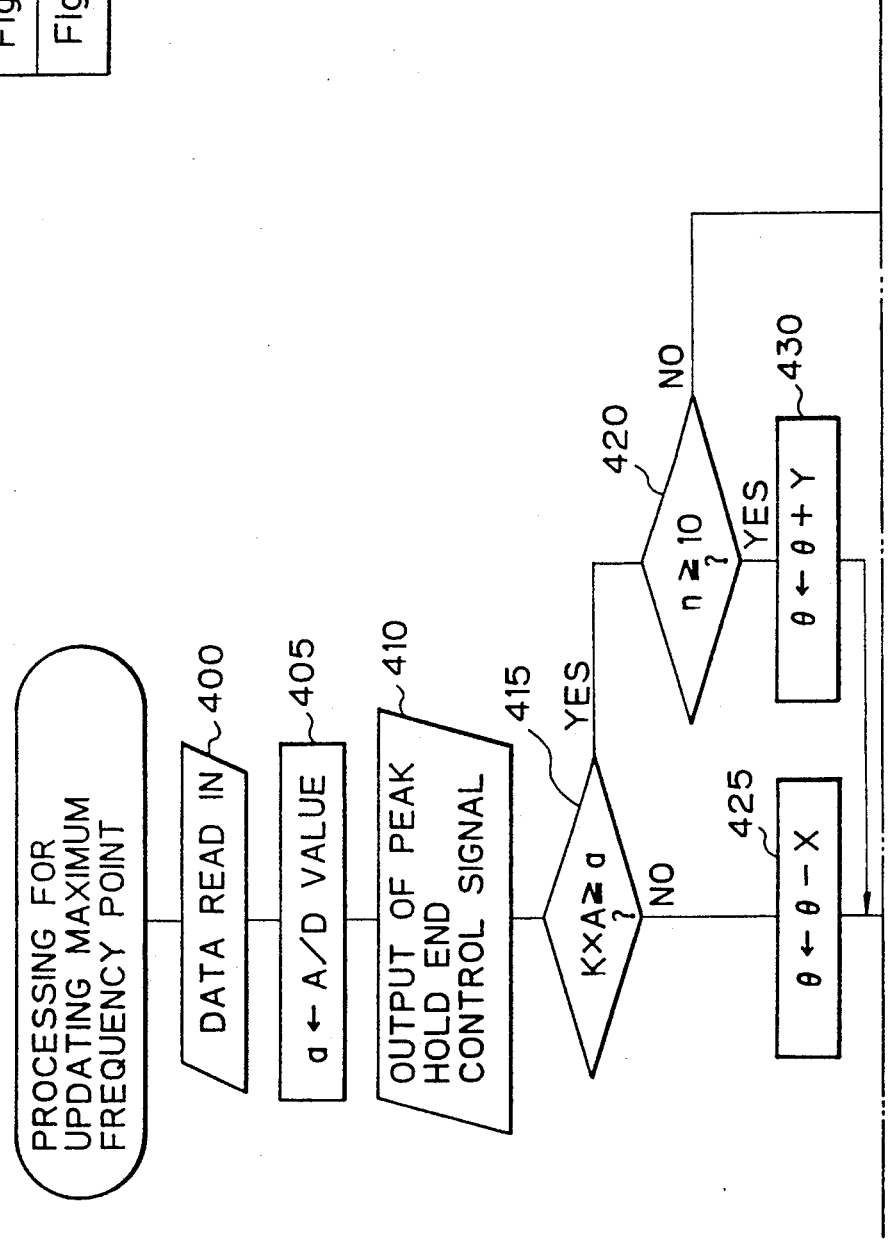

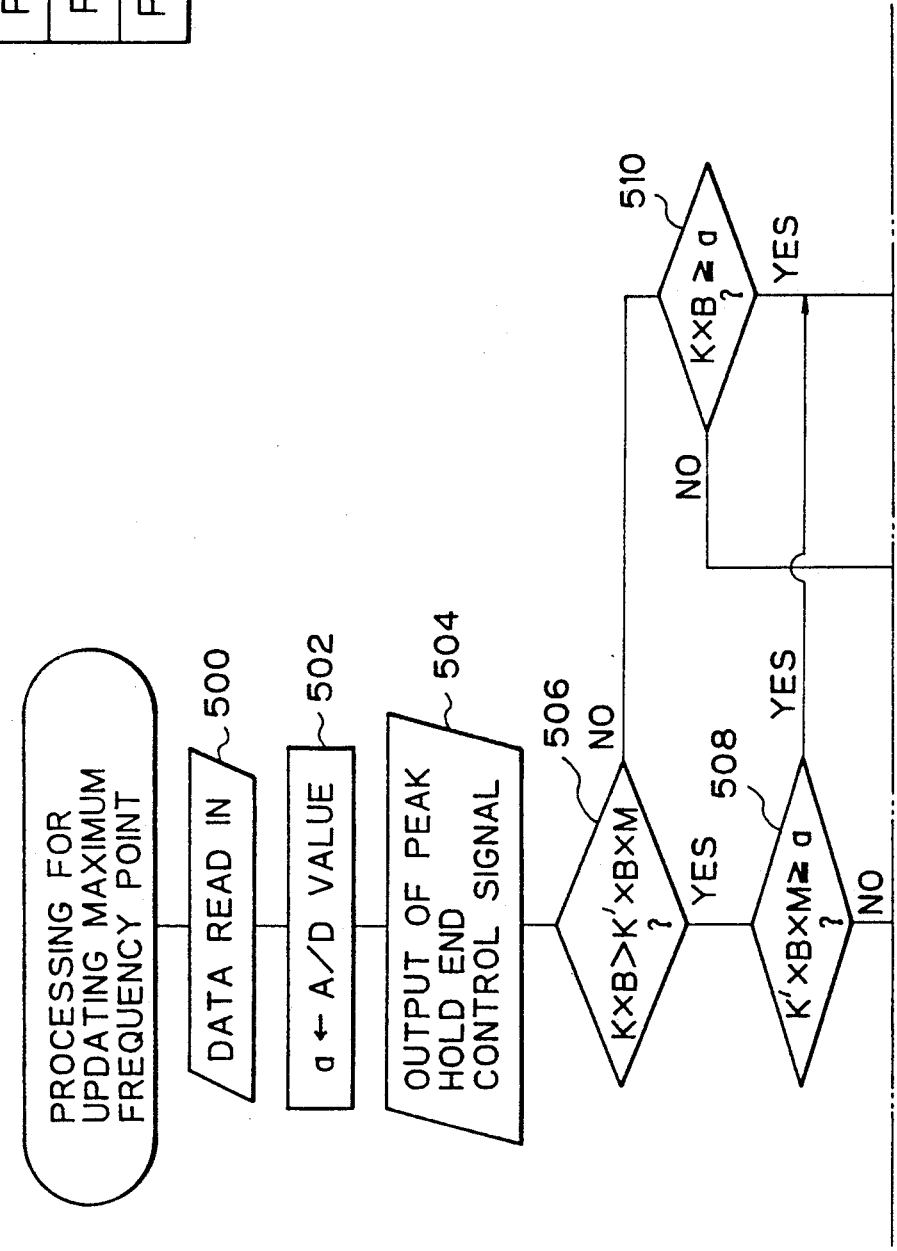

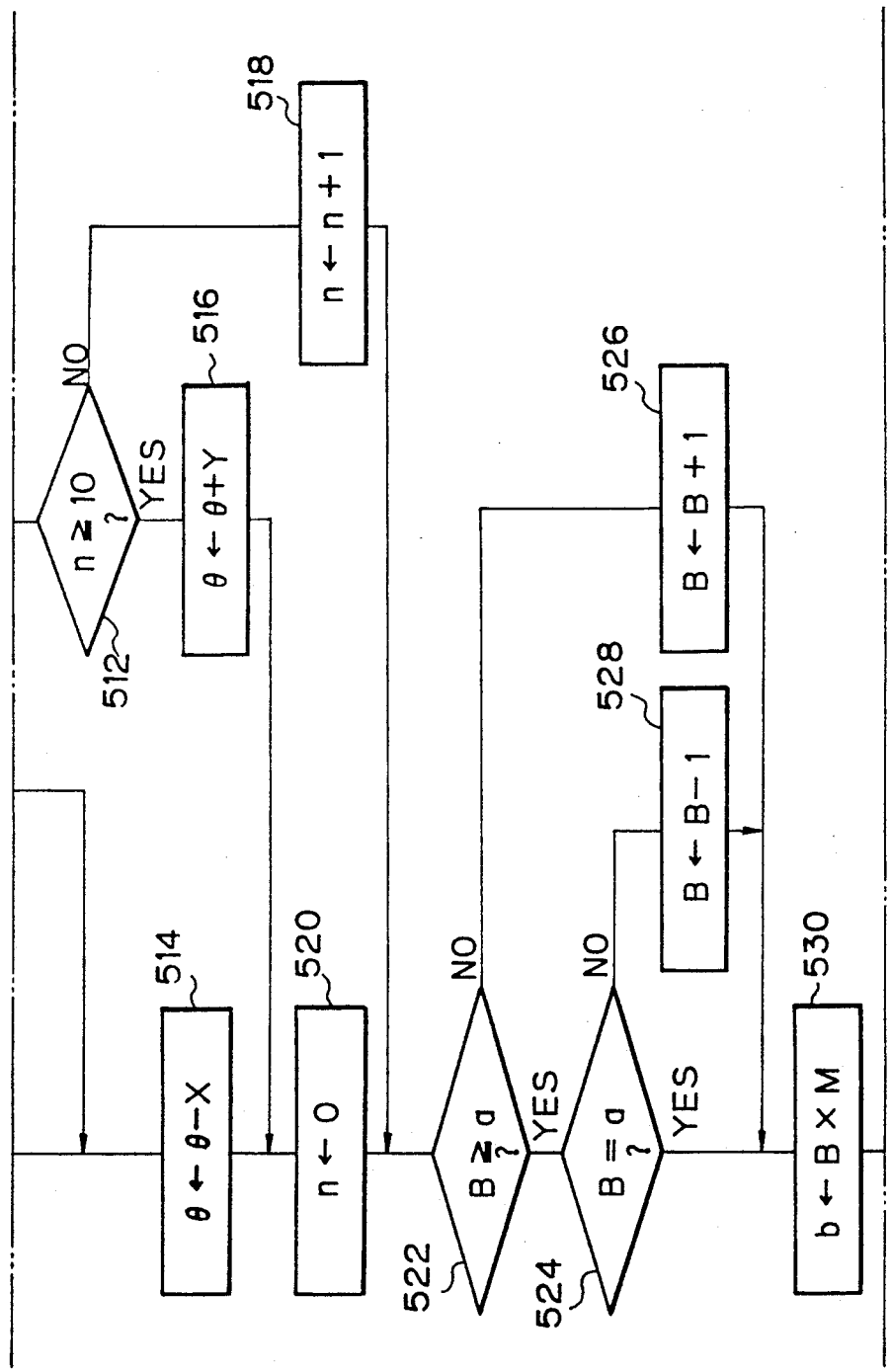

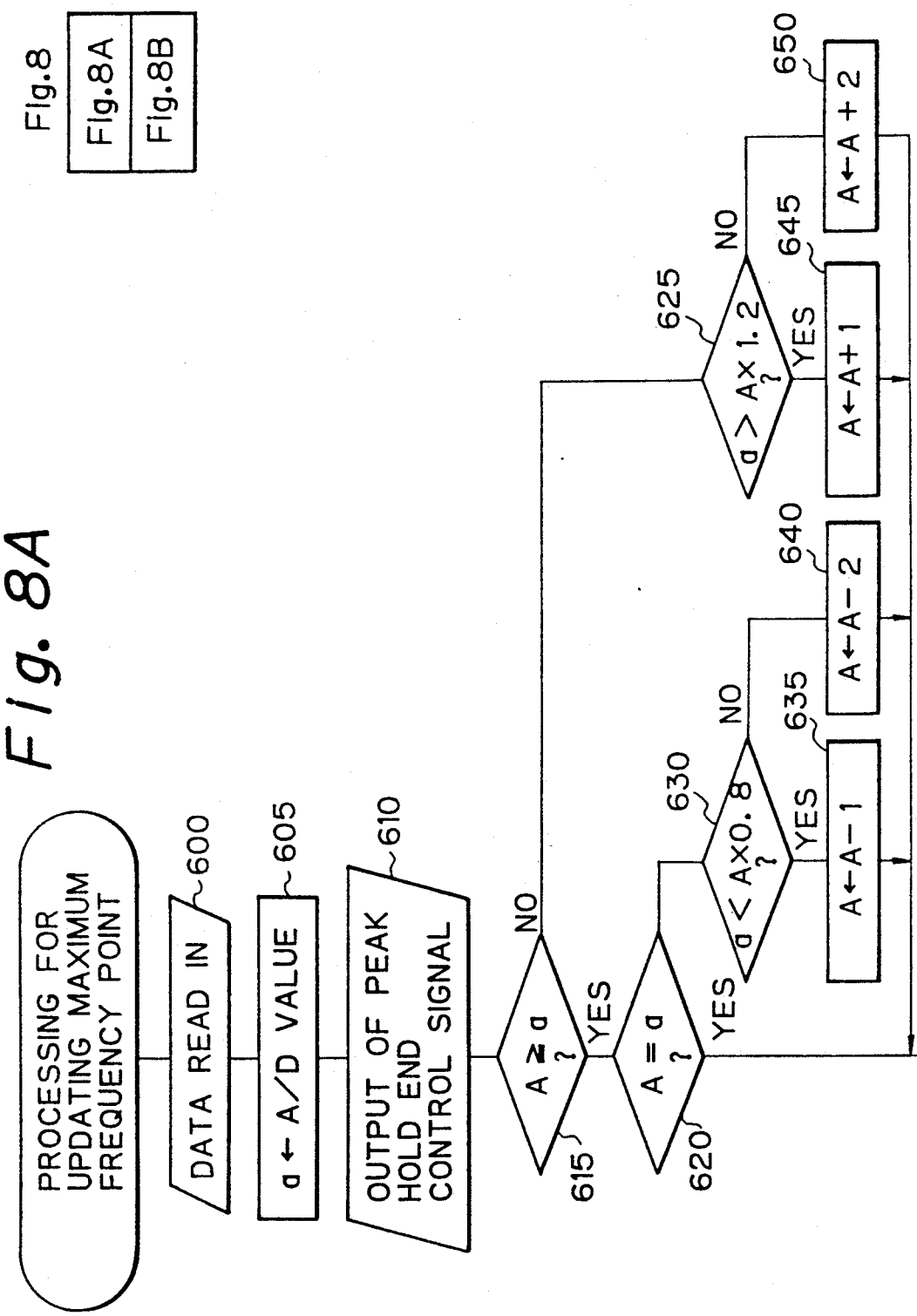

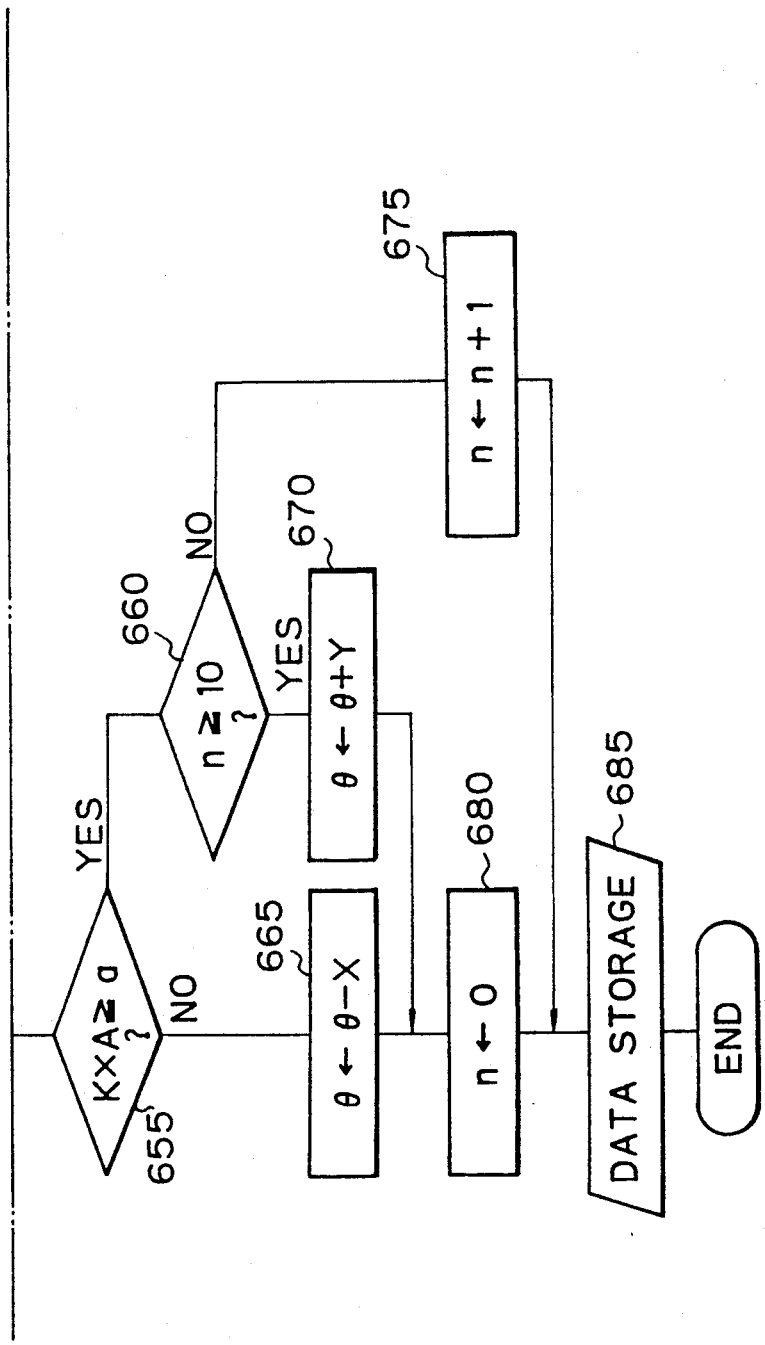

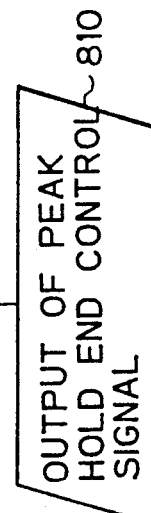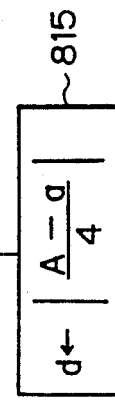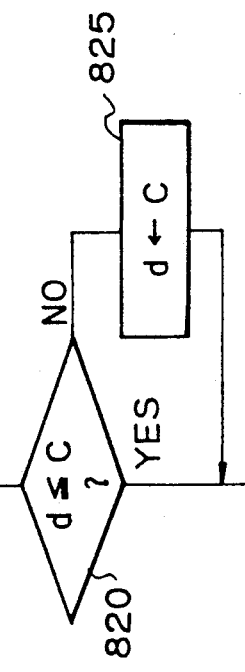
Fig. 11
| Fig. 11A | Fig. 11B |
Fig. 11A
PROCESSING FOR UPDATING MAXIMUM FREQUENCY POINT — 800
DATA READ IN — 800
$a \leftarrow A/D$ VALUE — 805
OUTPUT OF PEAK HOLD END CONTROL SIGNAL — 810
$d \leftarrow \left| \dfrac{A-a}{4} \right|$ — 815
$d \leq C$ ? — 820
YES / NO
$d \leftarrow C$ — 825

KNOCKING CONTROL APPARATUS OF INTERNAL COMBUSTION ENGINE

BACKGROUND OF THE INVENTION

1. Field of the Invention

The present invention relates to a knocking control apparatus of an internal combustion engine.

2. Description of the Related Art

During engine operation, the engine body continues to vibrate, but if knocking occurs, the intensity of the vibration of the engine body grows larger. Therefore, it is possible to detect the occurrence of knocking from the increase in the intensity of the vibration of the engine body. Thus, usually, a knocking sensor for generating an output voltage proportional to the strength of the vibration of the engine body is mounted on the engine body and when the strength of the vibration of the engine body exceeds a predetermined knocking determination level, that is, when the output voltage of the knocking sensor exceeds the predetermined knocking determination level, it is judged that knocking has occurred.

However, the engine body vibrates even without occurrence of knocking in this way, and the strength of the vibration of the engine body differs according to each engine as well. Further, along with the increase of the rotational speed of the engine, the strength of the vibration of the engine body grows larger. That is, even when knocking does not occur, the strength of the vibration of the engine body fluctuates by a considerable amount. Therefore, if the knocking determination level is set low, it may be judged that knocking has occurred even if it has not and if the knocking determination level is set high, it may be judged that knocking has not occurred despite it having occurred. Therefore, to reliably detect the occurrence of knocking, it is important what level the knocking determination level is set at. In this case, if it were possible to set the knocking determination level higher than the strength of the vibration of the engine body where knocking does not occur, then it would be possible to reliably detect the occurrence of knocking using the knocking determination level. Therefore, to reliably detect the occurrence of knocking, it is necessary to accurately detect the strength of the vibration of the engine body when knocking does not occur. There are two conventional methods used for finding the strength of vibration of an engine body at which knocking does not occur.

These two methods will be explained with reference to FIG. 16.

FIG. 16 shows the relationship between the magnitude of the output voltage (V) of a knocking sensor at a certain engine rotational speed, that is, the amplitude of the vibration, and the number of occurrences of vibration generated at various amplitudes, that is, the frequency of occurrence. Here, FIG. 16(A) shows the case where no knocking occurs at all, FIG. 16(B) the case where some knocking occurs, and FIG. 16(C) the case where excess knocking occurs.

As shown in FIG. 16(A), when no knocking occurs at all, the frequency of occurrence of vibration of the amplitude A is the highest and the frequency of occurrence of vibration becomes lower the further away the amplitude from the amplitude A. Therefore, below, the amplitude A is referred to as the maximum frequency point.

When knocking occurs, vibration with a large vibration amplitude occurs, so as shown in FIG. 16(B), the frequency of occurrence of large amplitude vibration rises and if knocking further occurs, as shown in FIG. 16(C), the frequency of occurrence of vibration with a large amplitude rises further. Even if knocking occurs, however, the vibration of the engine body caused by reasons other than knocking occurs in the same way as when no knocking occurs, so even if knocking occurs, the maximum frequency point A does not change, as will be understood from FIG. 16.

Therefore, one of the above two methods finds the maximum frequency point A by some method or another and uses A·k, obtained by multiplying A by k, as the knocking determination level so as to judge that knocking occurs when the vibration amplitude value exceeds this knocking determination level A·k. This method is considered to be optimal as a method for judging the occurrence of knocking.

The other of the above two methods finds the mean value of the frequency of occurrence of vibration, i.e., the center of gravity position of the area of the portion surrounded by the curve shown in FIG. 16. This mean value of the frequency of occurrence of vibration is indicated by B in FIG. 16, with B hereinafter referred to as the mean frequency value. According to this method, B·k, obtained by multiplying B by k, is used as the knocking determination level and knocking is judged to occur when the vibration amplitude exceeds this knocking determination level B·k. However, in this method, as shown in FIG. 16, when the frequency of occurrence of knocking becomes higher, the mean frequency value B gradually becomes larger and along with this the knocking determination level B·k also becomes larger, so if the frequency of occurrence of knocking becomes higher, there is the problem that it becomes impossible to detect the knocking. Therefore, as the knocking determination level, it is said to be better to use A·k than B·k.

Thus, the problem lies in how to find the maximum frequency point A. Regarding this, there is known a knocking control apparatus which finds the vibration amplitude a predetermined number of times, statistically finds the distribution of the frequency of occurrence of the vibration amplitude, and finds the maximum frequency point A from the frequency distribution found statistically (see Japanese Unexamined Patent Publication (Kokai) No. 63-253155). However, when statistically finding the distribution of frequency of occurrence in this way, the amount of data to be stored becomes greater, so a large load is placed on the RAM or else it takes a long time to find the maximum frequency point A.

SUMMARY OF THE INVENTION

The object of the present invention is to provide a knocking control apparatus which finds the maximum frequency point by a simple method and uses this maximum frequency point to control the occurrence of knocking.

According to the present invention, there is provided a knocking control apparatus comprising: detection means for detecting the maximum strength of vibration generated by an engine in a predetermined range of crank angle; updating means for updating a maximum frequency point so that the maximum frequency point matches a maximum strength of vibration generated most frequently by the engine; level setting means for setting a knocking determination level based on the maximum frequency point; and judgement means for judging that knocking has occurred when the maximum strength of vibration occurring in the engine exceeds the knocking determination level, a first region of a predetermined fixed width being set at the side of the larger strength of vibration of the maximum frequency point, a second region which has the same width as the first region being set at the side of the smaller strength of vibration of the maximum frequency point, the updating means increasing the maximum frequency point by the predetermined correction when the maximum strength of vibration occurring in the engine is in the first region and decreasing the maximum frequency point by a predetermined correction when the maximum strength of vibration occurring in the engine is in the second region.

The present invention may be more fully understood from the description of preferred embodiments of the invention set forth below, together with the accompanying drawings.

BRIEF DESCRIPTION OF THE DRAWINGS

In the drawings

FIG. 1 is a diagram for explaining the method of finding the maximum frequency point according to the present invention;

FIGS. 2, 2A through 2C are an overview of a knocking control apparatus;

FIGS. 6, 6A and 6B are a flow chart for execution of processing for updating the maximum frequency point;

FIGS. 7, 7A-7C are a flow chart for the execution of another embodiment of processing for updating the maximum frequency point;

FIGS. 8, 8A and 8B are a flow low chart for execution of still another embodiment of processing for updating the maximum frequency point;

FIGS. 10, 10A and 10B are a flow chart for execution of still another embodiment of processing for updating the maximum frequency point;

FIGS. 11, 11A and 11B are a flow chart for execution of another embodiment of processing for updating the maximum frequency point;

DESCRIPTION OF THE PREFERRED EMBODIMENTS

Figure 2B:
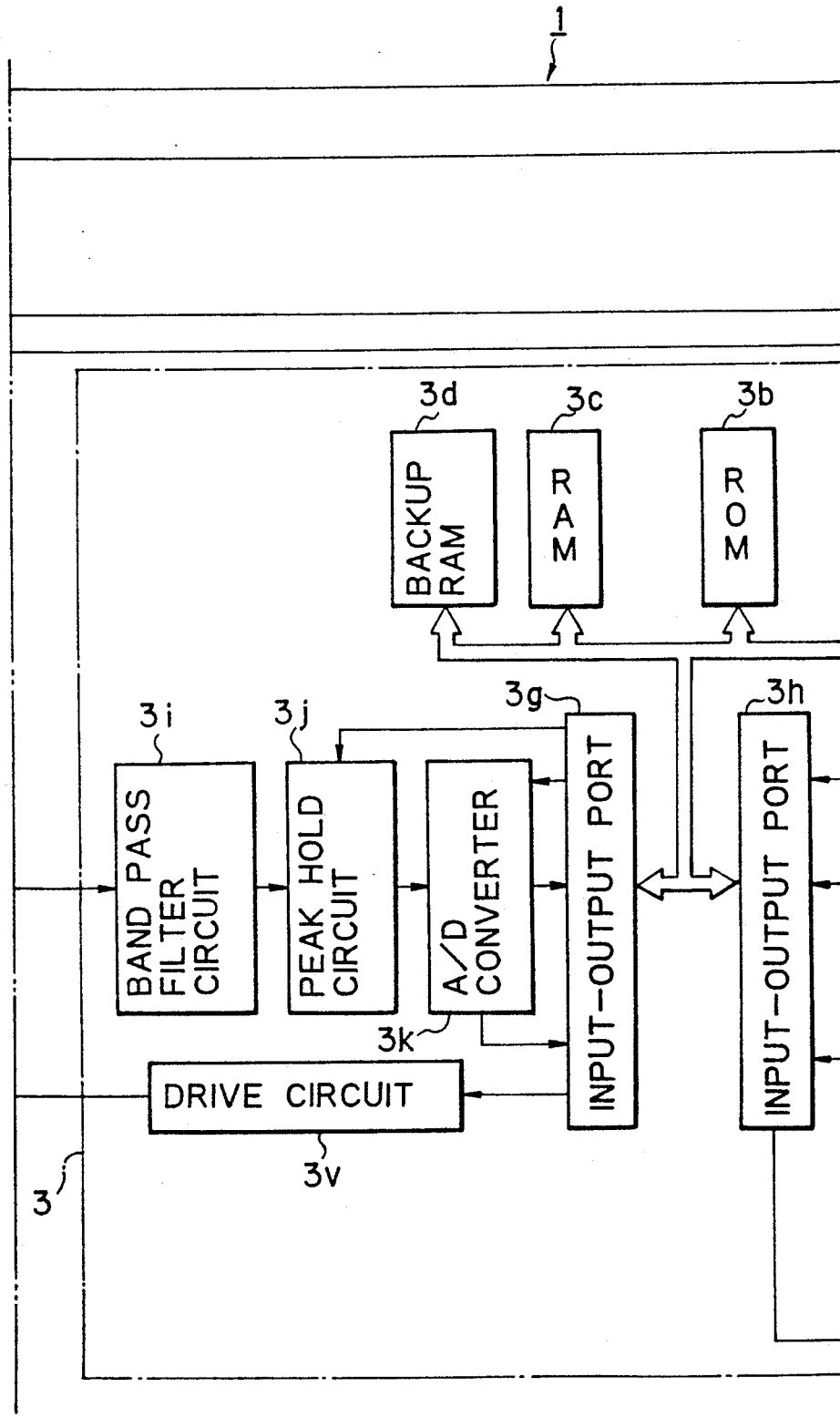

First, an explanation will be made of the method of finding the maximum frequency point A according to the present invention, referring to FIG. 1. In FIG. 1, the horizontal axis shows the peak value (V) of the output voltage of a knocking sensor in a predetermined range of crank angles, while the vertical axis shows the frequency of occurrence of vibration of the various vibration amplitudes. Further, the curve W in FIG. 1 shows the distribution of frequency statistically obtained at a certain engine rotational speed, while A0 shows the maximum frequency point. A shows the maximum frequency point before the engine rotational speed changes. The maximum frequency point is considered to change from A to A0 due to the rise of the engine rotational speed.

According to the present invention, regions k1 and k2 of the same width are set at the two sides of the maximum frequency point A and the outsides of these regions k1 and k2 are designated k3 and k4. If vibration having an amplitude within the region k1 occurs, the maximum frequency point A is increased by P1, if vibration having an amplitude within the region k2 occurs, the maximum frequency point A is decreased by P2, if vibration having an amplitude within the region k3 occurs, the maximum frequency point A is increased by P3, and if vibration having an amplitude within the region k4 occurs, the maximum frequency point A is decreased by P4. Here, P1=P2 and P3=P4.

First, to facilitate understanding of the behavior of the maximum frequency point A, an explanation will be made of the case where P3=P4=0. In this case, when vibrations of amplitudes within the regions k3 and k4 occur, the maximum frequency point A does not move. The maximum frequency point A moves by P1 or P2 only when vibration of amplitudes within the regions k1 and k2 occurs. In this case, clearly, the frequency of occurrence of vibration of an amplitude within the region k1 is higher than the frequency of occurrence of vibration of an amplitude within the region k2, therefore if P1=P2, the maximum frequency point A gradually approaches the maximum frequency point A0 and finally the maximum frequency point A matches the maximum frequency point A0. Even when the maximum frequency point A is to the right side of the maximum frequency point A0, in the same way the maximum frequency point A gradually approaches the maximum frequency point A0 and finally the maximum frequency point A matches the maximum frequency point A0. Therefore, even if the engine rotational speed changes and the maximum frequency point A0 changes, the maximum frequency point A will match the maximum frequency point A0 and it is possible to accurately detect the occurrence of knocking by setting the knocking determination level based on the maximum frequency point A.

Note that the mean frequency value B means the frequencies of occurrence of vibration at the two sides are equal. Therefore, if the regions k1 and k2 are not set and the maximum frequency point A is moved by P1 when vibration of an amplitude greater than the maximum frequency point A occurs, and is moved by P2 when vibration of an amplitude smaller than the maximum frequency point A occurs, the maximum frequency point A would match the mean frequency value B. The regions k1 and k2 are set so that the maximum frequency point A coincides with the maximum frequency point A0 without the maximum frequency point A matching the mean frequency value B.

On the other hand, the maximum frequency point A is moved by P3 and P4 when vibration of an amplitude within the regions k3 and k4 occurs so as to make the maximum frequency point A coincide with the maximum frequency point A0 as fast as possible when the engine rotational speed changes and the maximum frequency point A0 changes. That is, the frequency of occurrence of vibration having an amplitude of a region on the side of the maximum frequency point A0 among the region k3 and the region k4 is higher, so the maximum frequency point A quickly approaches the maximum frequency point A0.

Figure 6B:
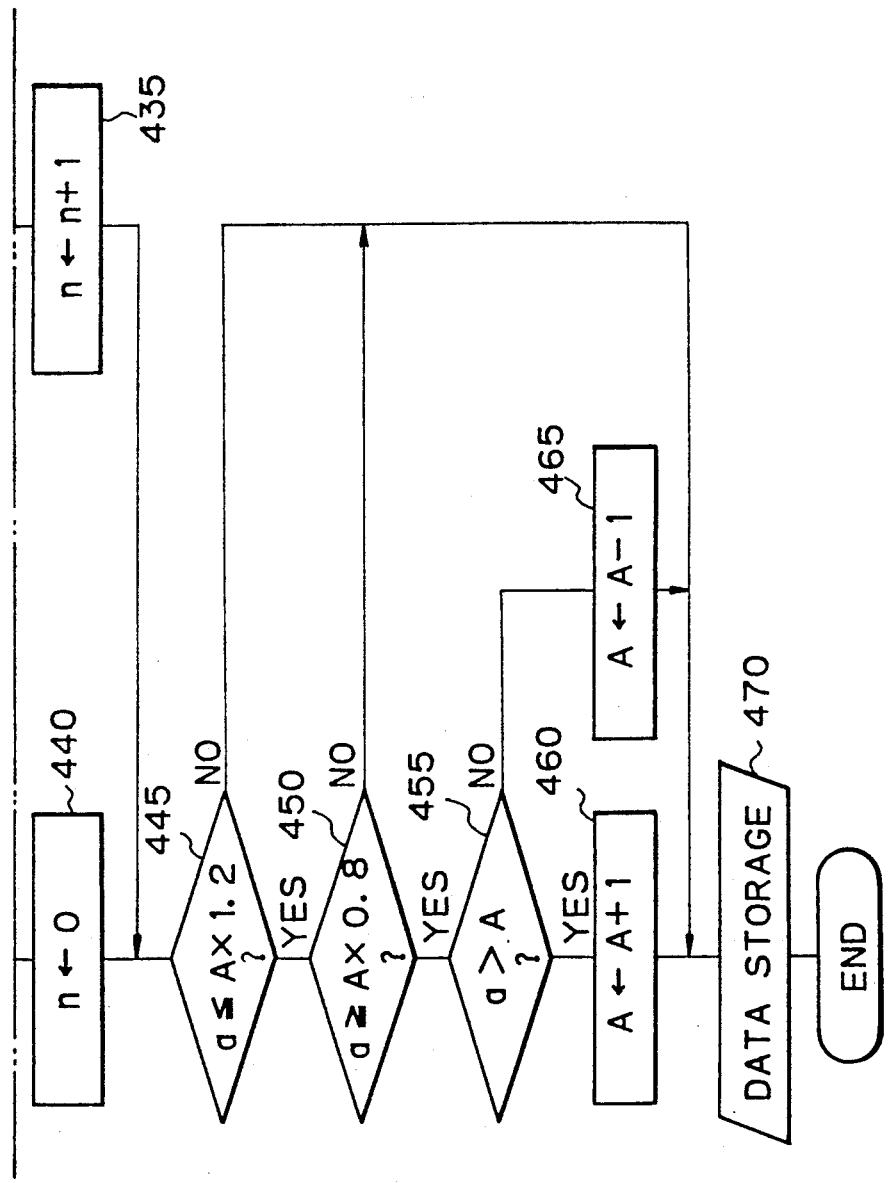
Figure 9:
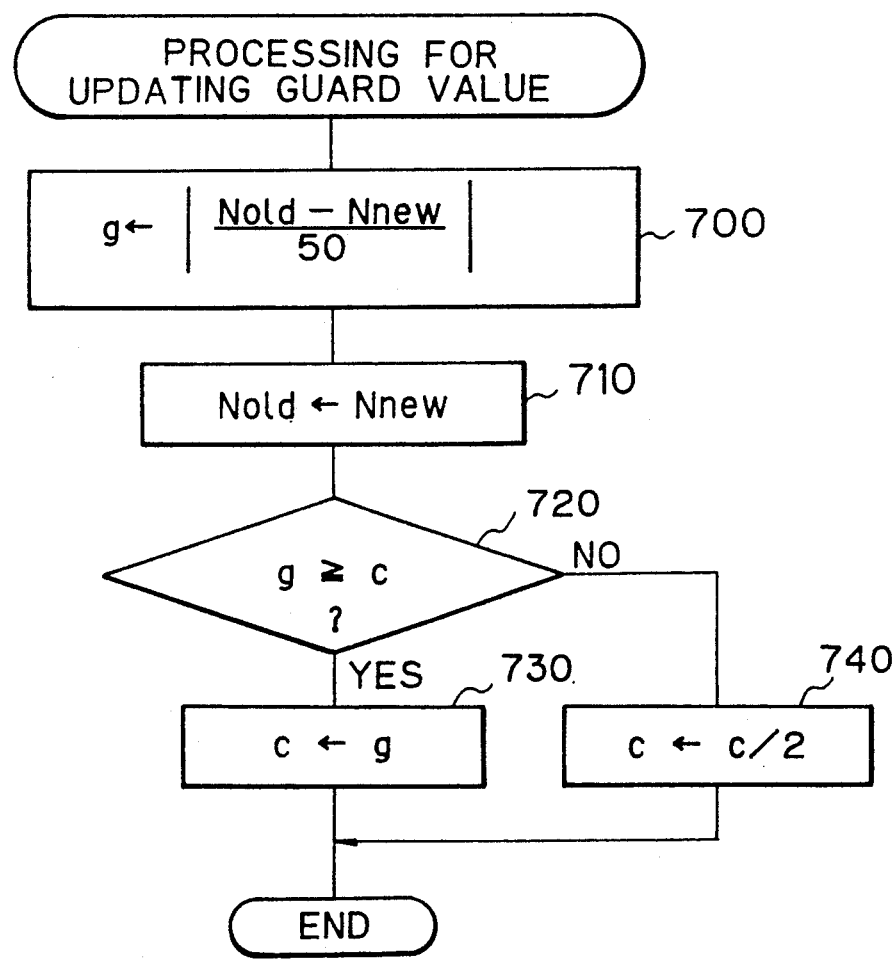
FIG. 9 is a flow chart for execution of processing for updating the guard value.
Figure 10B:
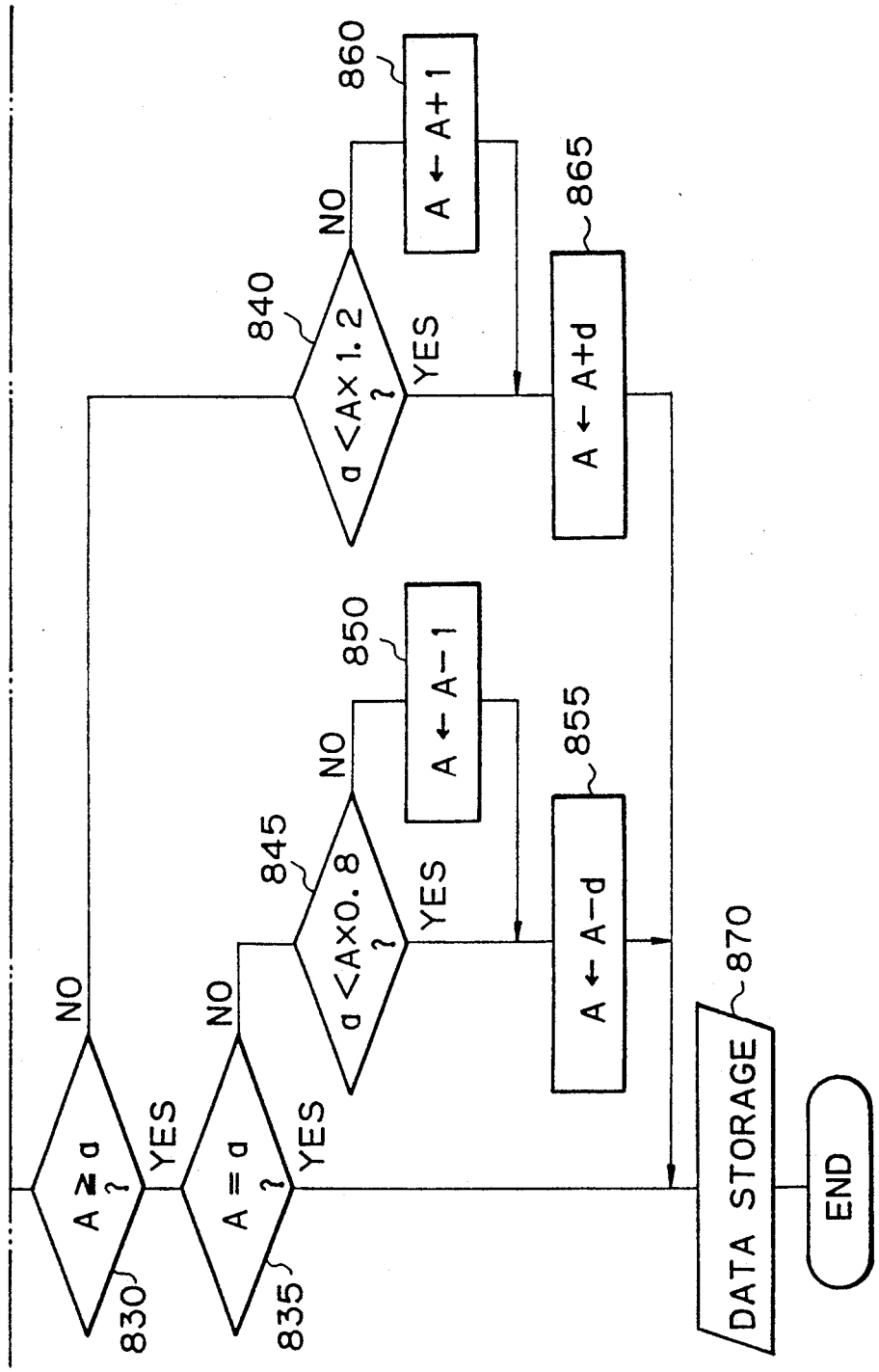

As mentioned above, P3 and P4 may be zero and P3 and P4 may be fixed values smaller than P1 and P2. Further, P3 and P4 may be changed. In the embodiments described below, for example, the embodiment shown in FIG. 6 shows the case where P3 and P4 are zero, and the embodiment shown in FIG. 8 shows the case where P3 and P4 are fixed values smaller than P1 and P2, while the embodiments of FIG. 9 and FIG. 10 show the case where P3 and P4 are changed.

Next, the knocking control apparatus will be explained with reference to FIG. 2.

Figure 2C:
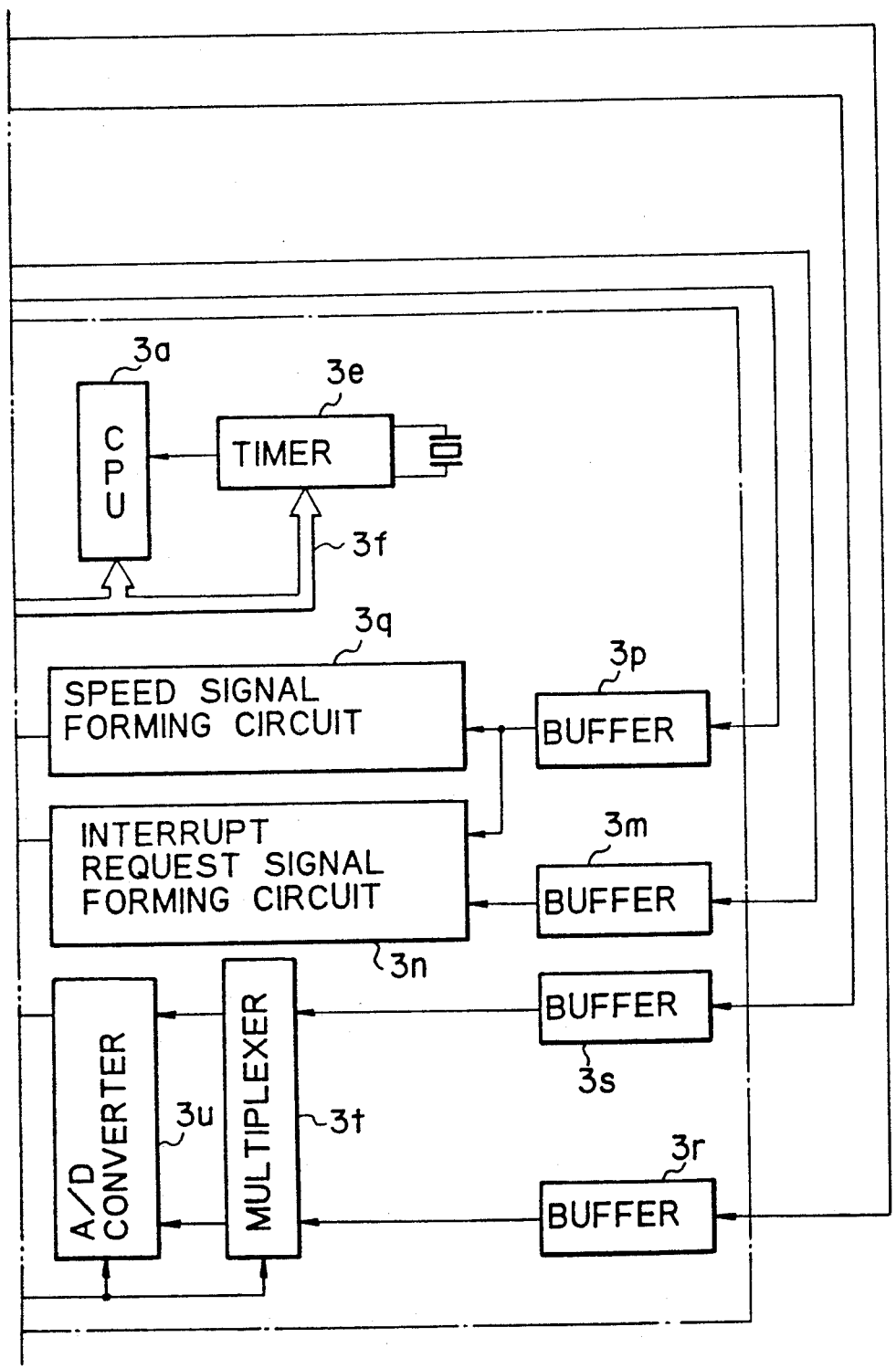

Referring to FIG. 2, the knocking control apparatus is shown by reference numeral 1. This knocking control apparatus 1 is provided with an electronic control unit (ECU) 3. An engine 2 is provided with a no. 1 cylinder 11, no. 2 cylinder 12, no. 3 cylinder 13, and no. 4 cylinder 14, while these cylinders are provided with spark plugs 15, 16, 17, and 18. These spark plugs 15, 16, 17, and 18 are given the high voltages necessary for the ignition, generated at the ignitor 19 provided with an ignition coil, through a distributor provided with a cam shaft which is linked with a crankshaft (not shown).

The knocking control apparatus 1 of the engine is provided with detectors such as a resonance type knocking sensor 31 which is provided at the cylinder block of the engine 2 and outputs mechanical vibration as electrical knocking signals, a cylinder discrimination sensor 32 which is housed in the distributor 20 and generates a cylinder discrimination signal (G signal) with each ¼ revolution of the cam shaft of the distributor 20, that is, with each 180° crank angle, a rotational angle sensor 33 which serves also as a rotational speed sensor which generates a rotational angle signal (Ne signal) with each 1/24th revolution of the camshaft of the distributor 20, that is, with each 30° crank angle, an intake pipe pressure sensor 34 which measures the intake pipe pressure in an intake manifold, and a water temperature sensor 35 which measures the engine temperature from the temperature of the cooling water of the engine 2. The detection signals of these sensors are input to the ECU 3.

The ECU 3 is constituted as a logical calculation circuit made of primarily a CPU 3a, ROM 3b, RAM 3c, backup RAM 3d, and timer 3e, which are connected through a common bus 3f to input and output ports 3g and 3h.

The knocking signal output by the knocking sensor 31 is input through a band pass filter circuit 3i which has an impedance conversion action and has the frequency band unique to knocking (7 to 8 kHz) as the pass band, a peak hold circuit 3j which performs a hold operation for the maximum amplitude of the knocking signal passing through the band pass filter circuit 3i in accordance with a control signal of the CPU 3a, an A/D converter 3k which performs A/D conversion on the output of the peak hold circuit 3j and outputs an A/D conversion completion interruption signal to the CPU 3a in accordance with the control signal of the CPU 3a, and the input/output port 3g to the CPU 3a. The cylinder discrimination signal (G signal) detected by the cylinder discrimination sensor 32 is input from the input/output port 3h to the CPU 3a through a buffer 3m and interruption request signal forming circuit 3n and the rotational angle signal (Ne signal) detected by the rotational angle sensor 33 is similarly input through a buffer 3p, interruption request signal forming circuit 3n, and speed signal forming circuit 3q. Further, the detection signal of the intake pipe pressure sensor 34 is input to a buffer 3r, the detection signal of the water temperature sensor 35 is input to a buffer 3s, then the two are input through a multiplexer 3t and A/D converter 3u operating in accordance with control signals of the CPU 3a from the input-output port 3h to the CPU 3a. On the other hand, the CPU 3a outputs control signals through the input-output port 3g to a drive circuit 3v and drives the ignitor 19 to control the ignition timing.

Figure 3:
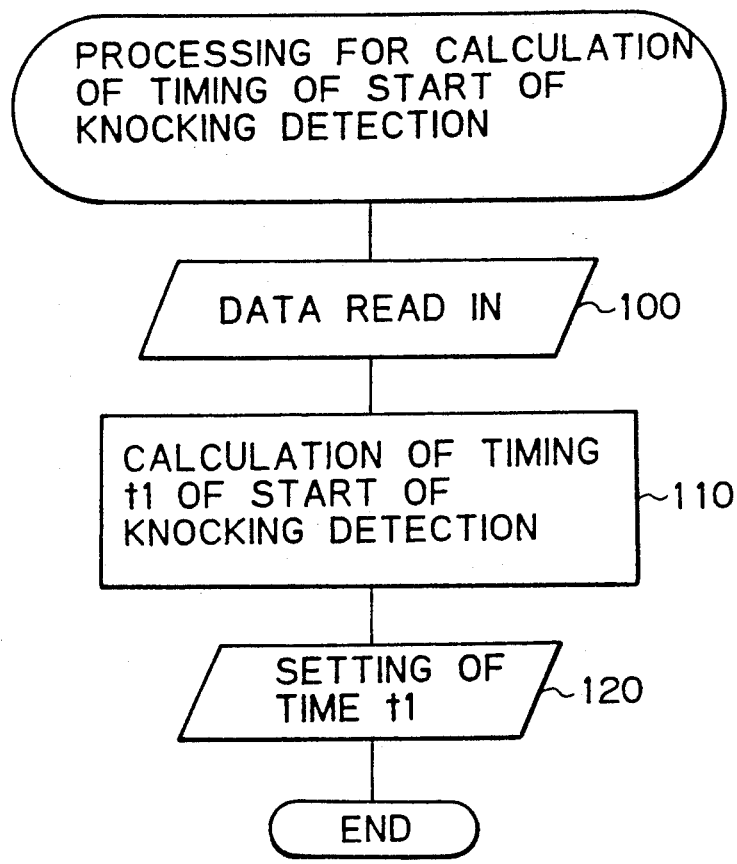
FIG. 3 is a flow chart for calculation of the time of the start of knocking detection.
Figure 5:
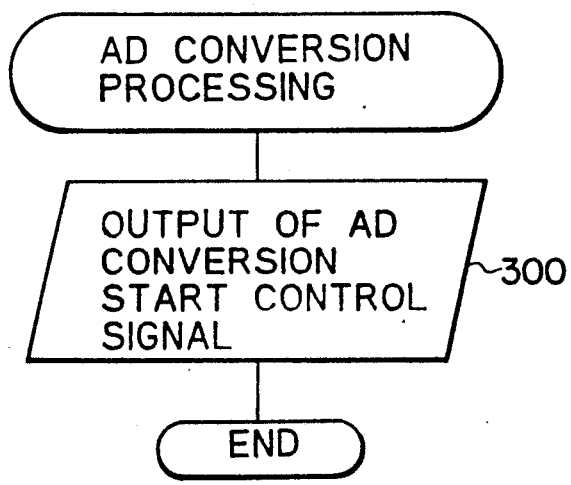
FIG. 5 is a flow chart for execution of the A/D conversion processing.
Figure 4:
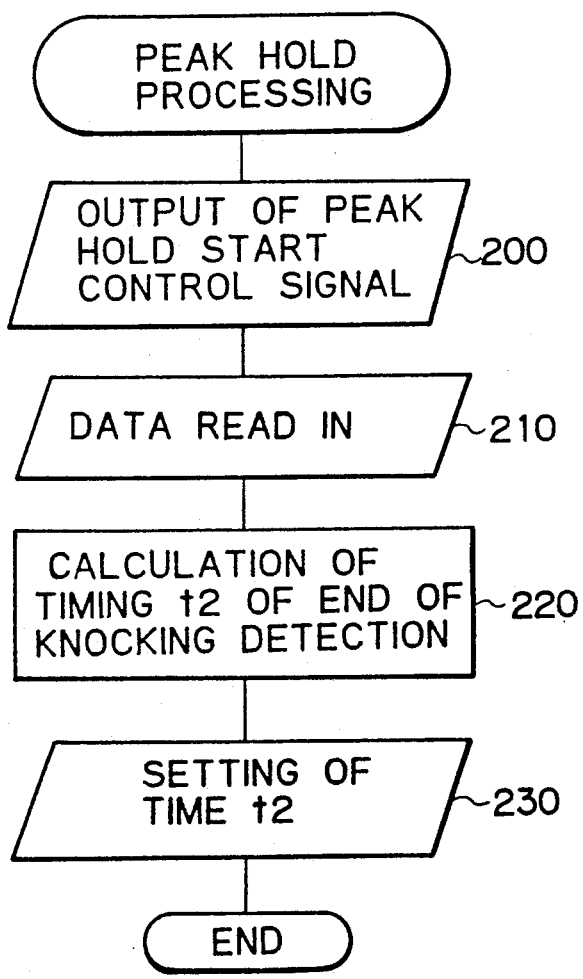
FIG. 4 is a flow chart for execution of peak hold processing.

Next, an explanation will be made of the processing for calculation of the timing of the start of knocking detection executed by the ECU 3, based on FIG. 3, the processing for peak holding, based on FIG. 4, the processing for A/D conversion, based on FIG. 5, and the processing for updating of the maximum frequency point, based on FIG. 6.

First, an explanation will be made of the processing for calculation of the timing of the start of knocking detection based on the flow chart shown in FIG. 3. This processing for calculation of the timing of the start of knocking detection is executed by an interruption signal generated at each specific predetermined crank angle (in this embodiment, the top dead center (TDC)).

First, at step 100, processing is performed so as to read in various types of data. Next, at step 110, processing is performed to calculate the timing t1 of the start of detection of knocking. Here, the time t1 of the start of knocking detection is calculated based on the starting crank angle of the predetermined knocking detection period (in this embodiment, for example, ATDC 10 to 20° CA), the detected current crank angle $C\theta°$ CA, and the current time TM of the timer 3e. Next, the control proceeds to step 120, where processing is performed to set the timing t1 of the start of knocking detection calculated at step 110 in registers inside the CPU 3a, then the processing is once ended. After this, this processing is repeatedly executed every specific crank angle.

Next, an explanation will be made of the processing for peak holding based on the flow chart shown in FIG. 4. This peak hold processing is executed by an interruption signal generated at the time t1 calculated by the processing for calculation of the timing of start of knocking detection mentioned above.

First, at step 200, processing is performed to output a control signal of a high level ("1") in the peak hold circuit 3j. By the processing of this step 200, the peak hold circuit 3j starts the peak hold operation of the knocking signal. Next, at step 210, processing is performed to read in various types of data. Next, the control proceeds to step 220, where processing is performed to calculate the timing t2 of the end of the knocking detection. Here, the timing t2 of the end of the knocking detection is calculated based on the crank angle from the starting time to the ending time of the predetermined knocking detection period (in this embodiment, for example, 60 to 90° CA), the detected current crank angle $C\theta°$ CA, and the current time TM of the timer 3e. Next, the control proceeds to step 230, where processing is performed to set the knocking detection ending time t2 calculated at step 220 in a register in the CPU 3a, then the processing is once ended. After this, this processing is repeated executed.

Next, an explanation will be made of the A/D conversion processing based on the flow chart of FIG. 5. This A/D conversion processing is executed by an interruption signal generated at a time t2 calculated by the processing for calculation of the ending time of the knocking detection mentioned above.

First, at step 300, processing is performed to output a control signal of the high level ("1") to the A/D conversion circuit 3k. By the processing of step 300, the A/D conversion circuit 3k starts the A/D conversion of the knocking signals. After the processing of step 300 is performed, the processing is ended. After this, the processing is repeatedly executed with every generation of an interruption signal.

Next, an explanation will be made of the processing for updating the maximum frequency point used for the knocking detection based on the flow chart of FIG. 6. This processing for updating the maximum frequency point includes processing for detection of knocking (steps 400 to 44) and the processing for updating the maximum frequency point (steps 445 to 470), the main portion of the embodiment performed after this. Further, this processing is activated by an A/D conversion ending interruption signal output by the A/D converter 3k (in this embodiment, for example, generated after the elapse of 10 msec after the start of A/D conversion).

First, at step 400, processing is performed to read in various types of data. Next, at step 405, processing is performed to set the A/D conversion value A/D obtained by the A/D converter 3k for the knock sensor output signal amplitude (knock signal amplitude) a. Next, the control proceeds to step 410, where processing is performed to output the peak hold ending control signal in the peak hold circuit 3j. That is, a control signal of a low level ("0") is output to the peak hold circuit 3j by the CPU 3a.

Next, at step 415, it is judged if the knocking signal amplitude a is lower than the product of the knocking determination level k, for judging the occurrence of knocking, and A, that is, if knocking has not occurred. If it is judged that knocking has not occurred, the control proceeds to step 420, while if it is judged that knocking has occurred, the control proceeds to step 425. Here, the value k is a coefficient (in this embodiment, for example, k=2). The value A is the maximum frequency point of the knocking signal amplitude a and is continuously updated.

At step 420, it is judged if the count of the counter n for counting the number of successive states of no knocking is more than 10. If the judgement at step 420 is affirmative, the control proceeds to step 430, while if it is negative, the control proceeds to step 435.

In the case where there are less than 10 states of no knocking, processing is performed at step 435 to add the value 1 to the count of the counter n, then the control proceeds to step 445.

On the other hand, if there are 10 or more states of no knocking, the control proceeds to step 430, where processing is performed to advance the advance correction $\theta$ of the ignition timing by the crank angle Y. This advance correction $\theta$ is the value used in the known processing for calculation of ignition timing performed every predetermined crank angle. That is, in the processing for calculation of the ignition timing, a basic ignition timing $\theta 0$ stored in the ROM 3b is calculated using as functions the intake pipe pressure PM of the engine 2 and the rotational speed Ne and this basic ignition timing $\theta 0$ is corrected by the advance correction value $\theta$ to calculate the target ignition timing. Therefore, the target ignition timing is advanced by the crank angle Y by the processing of step 430.

Next at step 440, the processing is performed for resetting the counter n to the value 0, then the control proceeds to step 445.

On the other hand, when knocking occurs, the processing is performed at step 425 to delay the advance correction $\theta$ of the ignition timing by the crank angle X. By this processing, the target ignition timing is delayed by the crank angle X and the occurrence of knocking is suppressed. After this, the control passes through step 440 to proceed to step 445.

Next, at step 445, it is judged if the knocking signal amplitude value a is lower than the product A×k1 of the maximum frequency point A and the coefficient k1 and, if affirmative, the control proceeds to step 450. Here, the coefficient k1 (k1=1.2 in the embodiment shown in FIG. 6) is a value for judging if the knocking signal amplitude a is within a predetermined range (region k1 in FIG. 1) larger than the maximum frequency point A. Further, when the knocking signal amplitude a is larger than the range, no updating of the maximum frequency point A is performed.

Next, at step 450, it is judged if the knocking signal amplitude a is larger than the product A×k2 of the maximum frequency point A and the coefficient k2 and if the judgement is affirmative, the control proceeds to step 455. Here, the coefficient k2 (k2= 0.8 in the embodiment shown in FIG. 6) is the value for judging if the knocking signal amplitude a is within a predetermined range (region k2 in FIG. 1) smaller than the maximum frequency point A. If the maximum frequency point A is smaller than this range, the maximum frequency point A is not updated.

That is, the processing of step 445 and 450 is for judging if the detected knocking signal amplitude a is in a certain updating region including the maximum frequency point A. Only when in this updating region is the updating of the maximum frequency point A performed in step 455 on. That is, at step 455, it is judged if the knocking signal amplitude a is larger than the maximum frequency point A and if the judgement is affirmative, the control proceeds to step 460, while if the judgement is negative, it proceeds to step 465. At step 460, processing is performed to add the value 1 to the maximum frequency point A, then the control proceeds to step 470. On the other hand, at step 465, processing is performed to subtract the value 1 from the maximum frequency point A, then the control proceeds to step 470.

At step 470, processing is performed to store various types of data in the RAM 3c or the backup RAM 3d, then the processing is ended.

As explained above, in the first embodiment, when the knocking signal amplitude a obtained by A/D conversion of the peak hold value of the output signal of the knocking sensor 31 is in a predetermined range larger than the maximum frequency point A, the value 1 is added to the maximum frequency point A, while when the knocking signal amplitude a is in a predetermined range smaller than the maximum frequency point A, the value 1 is subtracted from the maximum frequency point A. As a result, the maximum frequency point A is made to match with a statistical maximum frequency point (A0 in FIG. 1) determined by the operating state and therefore it is possible to use this maximum frequency point A to determine the knocking determination level k×A and thereby reliably detect knocking. Further, since it is not necessary to store large amounts of data and statistically process the same in order to calculate the maximum frequency point A, it is possible to reduce the size of the regions used of the RAM 3c etc. for storing data and further it is possible to lighten the load of the CPU 3a since operation of statistical processing is no longer necessary.

Figure 7C:
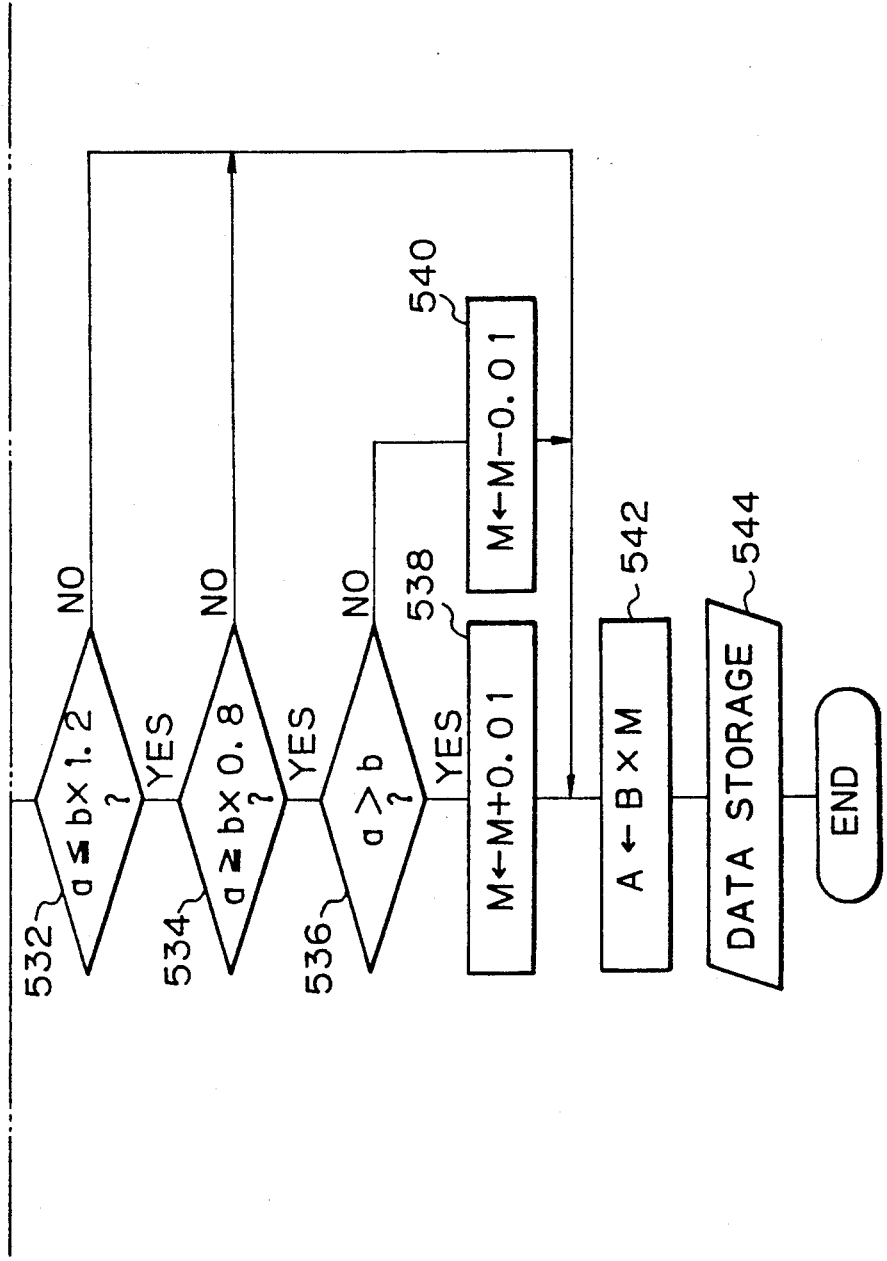

Next, an explanation will be made of a second embodiment according to the present invention based on FIG. 7. The main difference between this second embodiment and the first embodiment mentioned up to now is that in the second embodiment, use is made of both the maximum frequency point A and the mean frequency value B and selective use is made of the knocking determination level based on the maximum frequency point A and the knocking determination level based on the mean frequency value B in accordance with the situation. In other respects, the second embodiment is the same as the first embodiment, so the same portions are indicated by the same reference numerals and explanations thereof are omitted.

Next, an explanation will be made of the processing for updating the maximum frequency point performed in the second embodiment, based on the flow chart of FIG. 7. This processing includes, in the same way as the first embodiment, processing for detection of the knocking (steps 500 to 520) and processing for updating the maximum frequency point (steps 522 to 544).

First, at step 500, processing is performed to read in various types of data. Next, at step 502, processing is performed for setting the A/D conversion value A/D for the knocking signal amplitude a. Next, the control proceeds to step 504, where processing is performed to output the peak hold end control signal to the peak hold circuit 3j.

Next at step 506, it is judged if the knocking determination level k×B based on the mean frequency value B is larger than the knocking determination level k'×B×M based on the maximum frequency point A. If the judgement is affirmative at step 506, the control proceeds to step 508, while if the judgement is negative, it proceeds to step 510. Here, the coefficient k is a coefficient for converting the mean frequency value B to the knocking determination level, and the coefficient k' is the coefficient set to a value somewhat larger than the coefficient k of the above first embodiment. Further, the coefficient M is the value A/B calculated from the maximum frequency point A and the mean frequency value B set in the previous processing cycle.

The judgement of step 506 is processing for selecting the optimal knocking determination level for knocking detection by comparing the knocking determination level k×B based on the mean frequency value B and the knocking determination level k'×B×M based on the maximum frequency point A. That is, when knocking occurs frequently, the knocking determination level k×B becomes larger, so the control proceeds to step 508, where use is made of the knocking determination level k'×B×M based on the maximum frequency point A, which fluctuates only a little even due to the frequent occurrence of knocking. On the other hand, when knocking occurs infrequently, the control proceeds to step 510, where use is made of the knocking determination level k×B based on the mean frequency value B, which is superior in speed of response.

At step 508, it is judged if the knocking signal amplitude a is below the knocking determination level k'×B×M based on the maximum frequency point A to determine if knocking has occurred is judged. If it is judged that knocking has not occurred, the control proceeds to step 512, while if it is judged that knocking has occurred, the control proceeds to step 514.

On the other hand, at step 510, it is judged if the knocking signal amplitude a is below the knocking determination level k×B based on the mean frequency value B to judge if knocking has occurred. If it is judged that knocking has not occurred, the control proceeds to step 512, while if it is judged that knocking has occurred, the control proceeds to step 514.

At step 512, it is judged if the count of the counter n for counting the number of successive states of no knocking is 10 or more. If the judgement is affirmative at step 512, the control proceeds to step 516, while if it is negative, the control proceeds to step 518. At step 518, processing is performed to add the value 1 to the count of the counter n, then the control proceeds to step 522. On the other hand, at step 516, processing is performed to advance the advance correction $\theta$ of the ignition timing by the crank angle Y. Therefore, the processing of step 516 results in the target ignition timing being advanced by the crank angle Y. Next, at step 520, processing is performed to reset the counter n to the value 0 and then the control proceeds to step 522.

On the other hand, when knocking has occurred, the control proceeds to step 514 from step 508 or 510, where processing is performed to delay the advance correction $\theta$ of the ignition timing by the crank angle x. This processing results in the target ignition timing being delayed by the crank angle X and the occurrence of knocking being suppressed. After this, the control proceeds through step 520 to step 522.

At step 522, it is judged if the mean frequency value B is above the knocking signal amplitude a. If the judgement is affirmative at step 522, the control proceeds to step 524, while if the judgement is negative, the control proceeds to step 526. At step 524, it is judged if the mean frequency value B is equal to the knocking signal amplitude a. If equal, the control proceeds to step 530 and if not equal the value 1 is subtracted from the mean frequency value B at step 528 and the control proceeds to step 530. On the other hand, at step 526, the value 1 is added to the mean frequency value B and the control proceeds to step 530.

At step 530, processing is performed to set the value of the mean frequency value B multiplied by the above coefficient M as the provisional maximum frequency point b. That is, the provisional maximum frequency point b is set by multiplying the value A/B of the coefficient M by the reduced or increased mean frequency value B.

Next, at step 532, it is judged if the knocking signal amplitude a is below the product b×k2 of the provisional maximum frequency point b and the coefficient k3 (k3=1.2 in the embodiment shown in FIG. 7) and if the judgement is affirmative, the control proceeds to step 534. At step 534, it is judged if the knocking signal amplitude a is above the product b×k4 of the provisional maximum frequency point b and the coefficient k4 (k4=0.8 in the embodiment shown in FIG. 7) and if the judgement is affirmative, the control proceeds to step 536. The processing of steps 532 and 534 are for judging if the knocking signal amplitude a is in the range for updating the maximum frequency point A in the same way as in the first embodiment.

At step 536, it is judged if the knocking signal amplitude a is larger than the provisional maximum frequency point b. If the judgement is affirmative at step 536, the control proceeds to step 538, while if the judgement is negative, the control proceeds to step 540. At step 538, processing is performed to add the value 0.01 to the coefficient M, then the control proceeds to step 542. On the other hand, at step 540, processing is performed to subtract the value 0.01 from the coefficient M, then the control proceeds to step 542. That is, at steps 538 and 540, processing is performed to subtract from or add to the coefficient M for updating the maximum frequency point A.

Next, at step 542, the mean frequency value B is multiplied by the coefficient M and B×M is set as the maximum frequency point A. Next, at step 544, processing is performed to store the various types of data in the RAM 3c or the backup RAM 3d, then the processing is ended.

In the second embodiment explained above, if the mean frequency value B is constant, steps 532 to 540 perform the same processing for updating the maximum frequency point A as in the first embodiment. Therefore, even in the second embodiment, the maximum frequency point A is made to match with the maximum frequency point (A0 in FIG. 1) found statistically.

On the other hand, if for example the engine rotational speed rises, the distribution of the frequency of occurrence of vibration shifts to the high side of the vibration amplitude. In this case, the updating regions of the maximum frequency point A (k1 and k2 in FIG. 1) are limited to narrow ranges, so time is required until the maximum frequency point A reaches the maximum frequency point found statistically (A0 in FIG. 1). As opposed to this, if the distribution of frequency of occurrence of vibration changes, the mean frequency value B can follow this change with good response. In other words, the mean frequency value B is superior in transitional response.

Therefore, considering the case where the mean frequency value B is not constant, as will be understood from step 530 on, if the mean frequency value B becomes larger, the provisional maximum frequency point b becomes larger as well. This means that the mean frequency value B may be used to make the maximum frequency point A approach the maximum frequency point found statistically (A0 in FIG. 1) as quickly as possible. That is, the second embodiment shown in FIG. 7 is one with improved transitional response of the maximum frequency point A compared with the first embodiment.

Further, in the second embodiment, use is made of the knocking determination level k'×B×M based on the maximum frequency point A and the knocking determination level k×B based on the mean frequency value B for the knocking determination level, which is the smallest. This means the following. That is, first, when knocking frequently occurs and the mean frequency value B becomes larger, the knocking determination level based on the maximum frequency point A is used for the judgement of knocking, so it is possible to accurately detect the occurrence of knocking. Second, when the engine rotational speed falls, the mean frequency value B with its good transitional response becomes smaller before the maximum frequency point A. At this time, use is made of the knocking determination level based on the mean frequency value B, which becomes smaller earlier, so as to enable reliable detection of the occurrence of knocking.

Note that it is possible to use the processing for updating the maximum frequency point A in the second embodiment (steps 530 to 542) and the processing for updating the maximum frequency point A in the first embodiment, which does not use M (steps 445 to 465). As will be understood from the above explanation, the processing for updating the maximum frequency point A in the first embodiment has the advantage of simpler calculation, while the processing for updating of the maximum frequency point A in the second embodiment has the advantage of superiority in the transitional response.

Next, an explanation will be made of a third embodiment and fourth embodiment referring to FIG. 8 to FIG. 10. The third embodiment and fourth embodiment differ considerably f the first embodiment and second embodiment in that the point that the regions for increasing the maximum frequency point A and the regions for decreasing the same are classified into regions for large updating and regions for small updating, respectively.

First, an explanation will be given of the processing for updating the maximum frequency point of the third embodiment based on the flow chart of FIG. 8.

At step 600, processing is performed for reading in various types of data. Next, at step 605, processing is performed to set the A/D conversion value A/D as the knocking signal amplitude a. Next, the control proceeds to step 610, where processing is performed to output the peak hold end control signal to the peak hold circuit 3j.

Next, at step 615, it is judged if the maximum frequency point A is higher than the knocking signal amplitude a. If the judgement at step 615 is affirmative, the control proceeds to step 620, while if the judgement is negative, the control proceeds to step 625. At step 620, it is judged if the maximum frequency point A is equal to the knocking signal amplitude a and, if equal, the control proceeds to step 655, while if not equal, the control proceeds to step 630.

At step 630, it is judged if the knocking signal amplitude a is smaller than the product A×k5 of the maximum frequency point A and the coefficient k5 (k5=0.8 in the example shown in FIG. 8). If the judgement at step 630 is affirmative, the control proceeds to step 635, while if the judgement is negative, the control proceeds to step 640. At step 635, processing is performed to subtract the value 1 from the maximum frequency point A, then the control proceeds to step 655. On the other hand, at step 640, processing is performed to subtract the value 2 from the maximum frequency point A and then the control proceeds to step 655.

On the other hand, at step 625, it is judged if the knocking signal amplitude a is larger than the product A×k6 of the maximum frequency point A and the coefficient k6 (k6=1.2 in the embodiment shown in FIG. 8). If the judgement at step 625 is affirmative, the control proceeds to step 645, while if the judgement is negative, the control proceeds to step 650. At step 645, processing is performed to add the value 1 to the maximum frequency point A, then the control proceeds to step 655. On the other hand, at step 650, processing is performed to add the value 2 to the maximum frequency point A and then the control proceeds to step 655.

That is, in steps 615 to 650, it is judged if the knocking signal amplitude a is in the regions k1 and k2 of FIG. 1 and if the knocking signal amplitude a is in the regions k1 and k2, the amount of updating of the maximum frequency point A is enlarged to the value 2. As opposed to this, if the knocking signal amplitude a is in the regions k3 and k4 outside of the regions k1 and k2, the amount of updating is made a smaller value 1.

Next, at step 655, it is judged if the knocking signal amplitude a is less than the knocking determination level k×A for judging the occurrence of knocking. If the judgement at step 655 is affirmative, the control proceeds to step 660, while if the judgement is negative, the control proceeds to step 665. At step 660, it is judged if the count of the counter n for counting the number of successive states of no knocking is 10 or more. If the judgement at step 660 is affirmative, the control proceeds to step 670, while if the judgement is negative, the control proceeds to step 675. At step 675, processing is performed to add the value 1 to the count of the counter n, then the control proceeds to step 685. On the other hand, at step 670, processing is performed to advance the advance correction $\theta$ of the ignition timing by the crank angle Y. Next, at step 680, processing is performed to reset the counter n to the value 0, then the control proceeds to step 685. On the other hand, if knocking occurs, the control proceeds to step 665 where processing is performed to delay the advance correction $\theta$ of the ignition timing by the crank angle X to suppress the knocking. After this, the control proceeds through the step 680 to step 685.

At step 685, processing is performed to store the various types of data in the RAM 3c or the backup RAM 3d, then the processing is ended.

As explained above, according to the third embodiment, the regions for increasing the maximum frequency point A and the regions for decreasing the same are each divided into two regions and the amounts of updating in the regions nearer the maximum frequency point A are set larger (twice as large) as the amount of updating of the further regions. In this way, by determining the amount of updating, it is possible to make the maximum frequency point a quickly match the statistical maximum frequency point (A0 in FIG. 1) as explained with reference to FIG. 1. That is, if the amount of updating is set in this way, then in FIG. 1, the frequency of occurrence of the vibration having the amplitude of the region at the side of the maximum frequency point A0 out of the region k3 and region k4 becomes higher, so the maximum frequency point A quickly approaches the maximum frequency point A0. Note that in the third embodiment, if P3 and P4 are made larger than P1 and P2, the maximum frequency point A can match the mean frequency value B, so P3 and P4 are set to be smaller than P1 and P2 so as to make the maximum frequency point A match the maximum frequency point A0.

Next, an explanation will be made of the fourth embodiment referring to FIG. 9 and FIG. 10.

In the fourth embodiment, a guard is placed on the amounts of updating P3 and P4 in accordance with the rate of change of the engine rotational speed so that when the rate of change of the engine rotational speed is large, the amounts of updating P3 and P4 (FIG. 1) of the maximum frequency point a are made larger and when the rate of change of the engine rotational speed is small, whereby when the engine rotational speed changes by a large amount, the maximum frequency point a is made to approach the statistical maximum frequency point (A0 in FIG. 1) faster than in the third embodiment.

First, an explanation will be made of the processing for updating the guard value based on the flow chart of FIG. 9. This processing is executed by interruption every 200 msec.

At step 700, the current engine rotational speed Nnew is subtracted from the previous engine rotational speed Nold found based on signals from the rotational speed sensor 33 and the absolute value of 1/50th of the difference is set for the guard value g. Here, the difference is divided by 50 because if the simple difference of the engine rotational speeds (Nold−Nnew) were used, the amount of updating would become too large.

Next, at step 710, the current engine rotational speed Nnew is set for the previous engine rotational speed Nold.

Next, at step 720, it is judged if the guard value d is higher than the guard value C set in the previous processing cycle, that is, if the rate of change of the engine rotational speed has become larger. If the judgement at step 720 is affirmative, the control proceeds to step 730, while if the judgement is negative, the control proceeds to step 740. At step 730, it is deemed that the rate of change of the engine rotational speed has increased and the guard value d is set for the guard value C, while at the step 740, it is deemed that the rate of change of the engine rotational speed has converged and the guard value C is corrected to $\frac{1}{2}$.

That is, this processing increases the guard value C when the rate of change of the engine rotational speed becomes larger and reduces the guard value C when the rate of change becomes smaller. In the embodiment shown in FIG. 9, when the rate of change of the engine rotational speed becomes less than 50 rpm/200 msec, the guard value g becomes almost zero and therefore the guard value C becomes almost zero.

Next, an explanation will be made of the processing for updating the maximum frequency point based on the flow chart of FIG. 10.

At step 800, processing is performed to read in the various types of data. Next, at step 805, processing is performed to set the A/D conversion value A/D for the knocking signal amplitude a. Next, the control proceeds to step 810, where processing is performed to output the peak hold end control signal to the peak hold circuit 3j.

Next, at step 815, processing is performed to set the absolute value of $\frac{1}{4}$th of the difference of the maximum frequency point A and the knocking signal amplitude a for the updating value d. This is so-called $\frac{1}{4}$th smoothing processing, where the updating value d becomes larger the larger the difference between the knocking signal amplitude a and the maximum frequency point A.

Next, at step 820, it is judged if the updating value d is less than the guard value C. If the judgement at step 820 is affirmative, the control proceeds to step 830, while if the judgement is negative, the control proceeds to step 825, where the value of the guard value C is set as the updating value d. That is, at step 820, if it is judged that the updating value d is not less than the guard value C, the guard value C found by the processing of the above-mentioned FIG. 9 is made the updating value d.

Next, at step 830, it is judged if the maximum frequency point A is more than the knocking signal amplitude a. If the judgement at step 830 is affirmative, the control proceeds to step 835, while if the judgement is negative, the control proceeds to step 840. At step 835, it is judged if the maximum frequency point A is equal to the knocking signal amplitude a. If equal, the control proceeds to step 870, while if not equal, it proceeds to step 845.

At step 845, it is judged if the knocking signal amplitude a is smaller than the product $A \times k7$ of the maximum frequency point A and the coefficient k7 (k7=0.8 in the embodiment shown in FIG. 10). If the judgement at step 845 is affirmative, the control proceeds to step 855, while if the judgement is negative, the control proceeds to step 850. At step 850, processing is performed to subtract the value 1 from the maximum frequency point A then the control proceeds to step 855. At step 855, the value of the maximum frequency point A minus the updating value d is set as the maximum frequency point A. That is, in steps 845 to 855, in the regions where the knocking signal amplitude a is far from the maximum frequency point A (region k4 in FIG. 1), the updating value d is subtracted from the maximum frequency point A, while in the regions where the knocking signal amplitude a is close to the maximum frequency point A (region k2 in FIG. 1), the value 1 and the updating value d are subtracted from the maximum frequency point A.

On the other hand, at step 840, it is judged if the knocking signal amplitude a is larger than the product $A \times k8$ of the maximum frequency point A and the coefficient k8 (k8=1.2 in the embodiment shown in FIG. 10). If the judgement at step 840 is affirmative, the control proceeds to step 865, while if the judgement is negative, the control proceeds to step 850. At step 860, processing is performed to add the value 1 to the maximum frequency point A, then the control proceeds to step 865. At step 865, the value of the maximum frequency point A plus the updating value d is set as the maximum frequency point A. That is, in steps 840, 860, and 865, in the regions where the knocking signal amplitude a is far from the maximum frequency point A (region k3 in FIG. 1), the updating value d is added to the maximum frequency point A, while in the regions where the knocking signal amplitude a is close to the maximum frequency point A (region k1 in FIG. 1), the value 1 and the updating value d are added to the maximum frequency point A.

Next, at step 870, processing is performed to store the data in the RAM 3c etc. and then the processing is ended.

For example, if the engine rotational speed rises, the distribution of the frequency of the vibration shifts to the larger vibration amplitude and the probability rises of occurrence of vibration of an amplitude larger than the maximum frequency point A. At this time, the updating value d found at step 815 in FIG. 10 becomes larger and since the change of the engine rotational speed is large, the guard value C also becomes larger. As a result, the updating value d added at the step 865 becomes larger, so the maximum frequency point A quickly rises. On the other hand, if the change in the engine rotational speed becomes smaller, the guard value C becomes smaller, so even if the updating value d found at step 815 is large, the updating value d subtracted at step 855 and the updating value d added at step 865 become extremely small compared with the value 1. As a result, the maximum frequency point A can match the statistical maximum frequency point (A0 in FIG. 1).

Figure 11B:
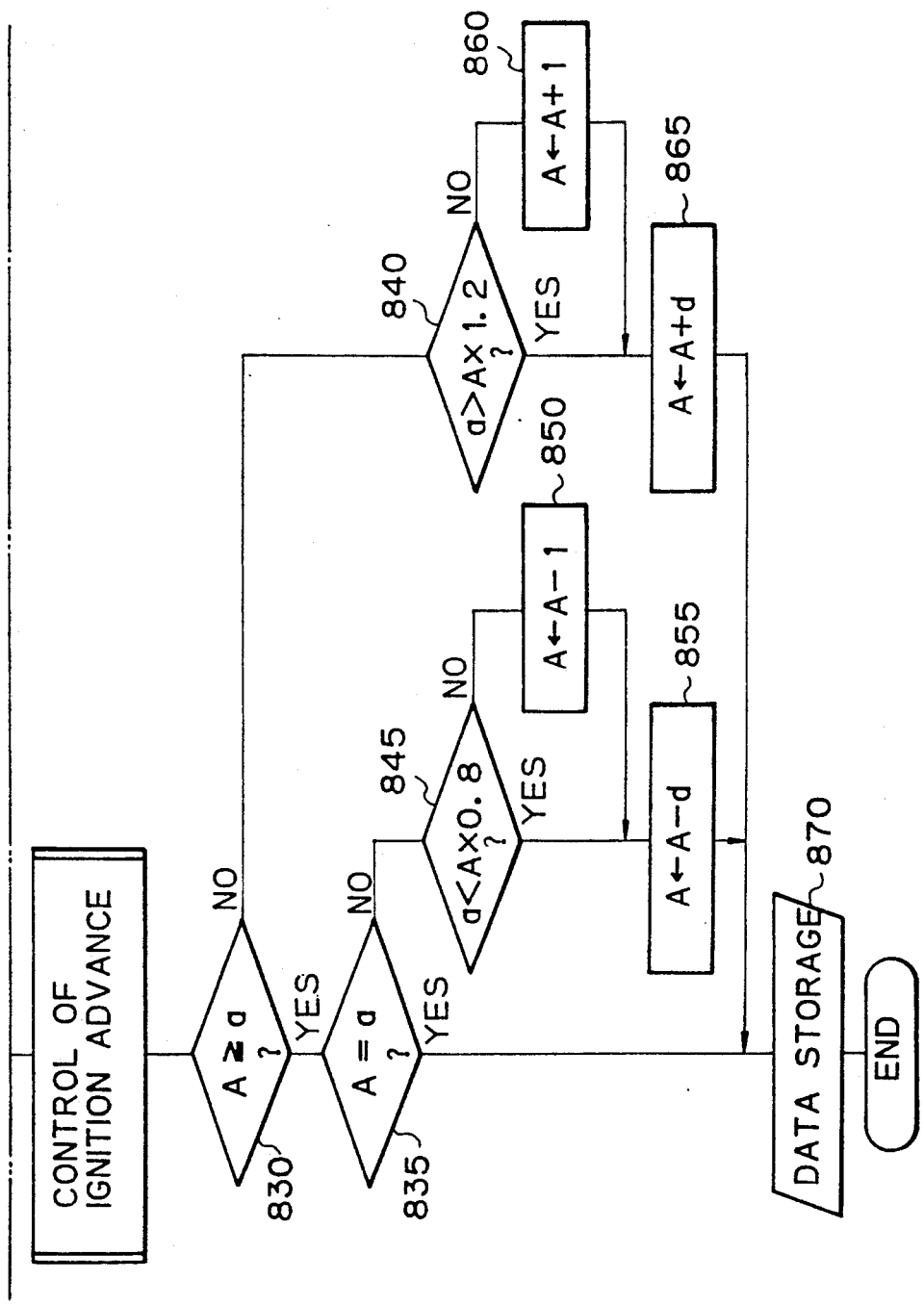
Figure 12:
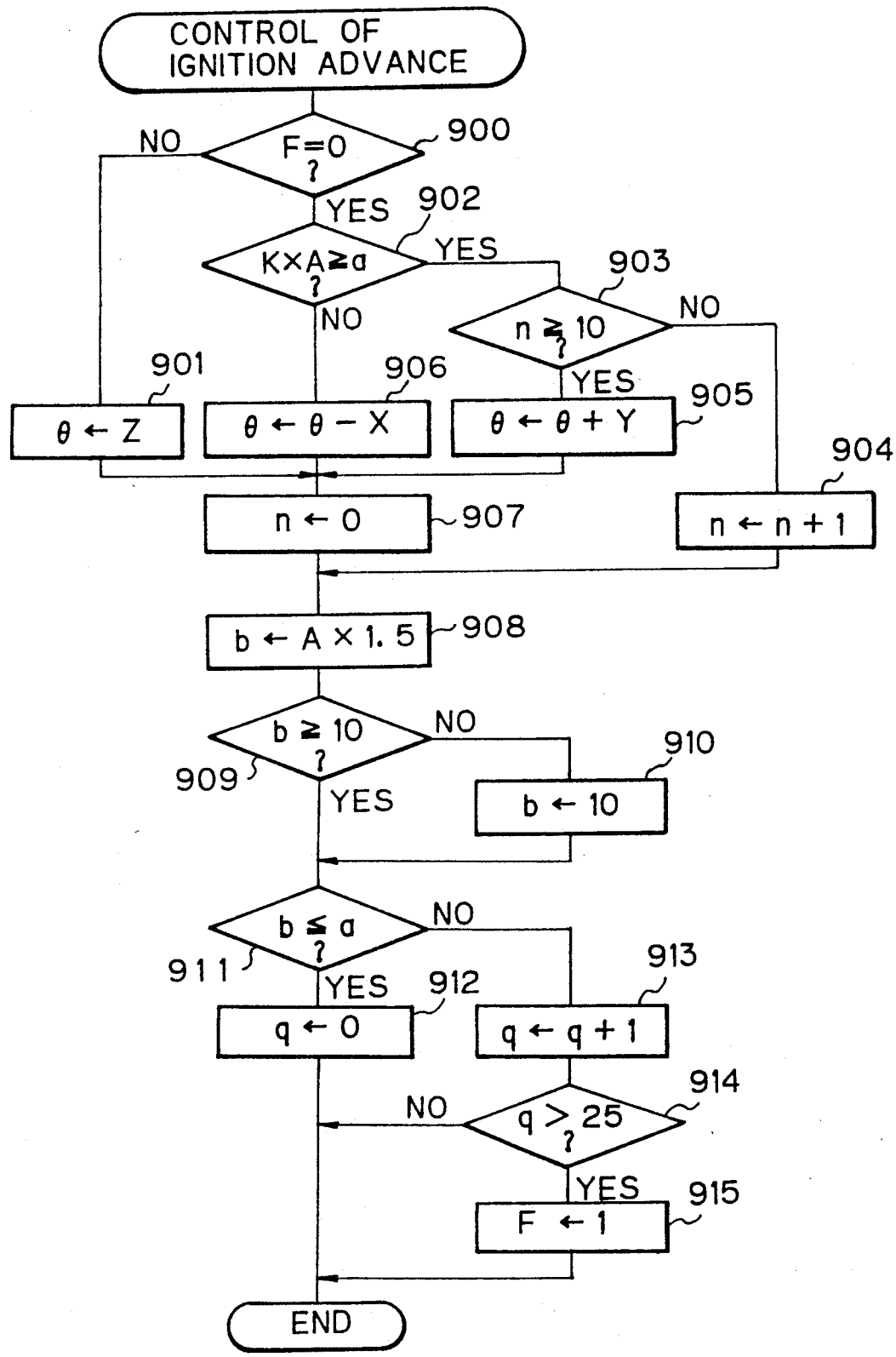
FIG. 12 is a flow chart of control of the ignition advance.
Figure 14:
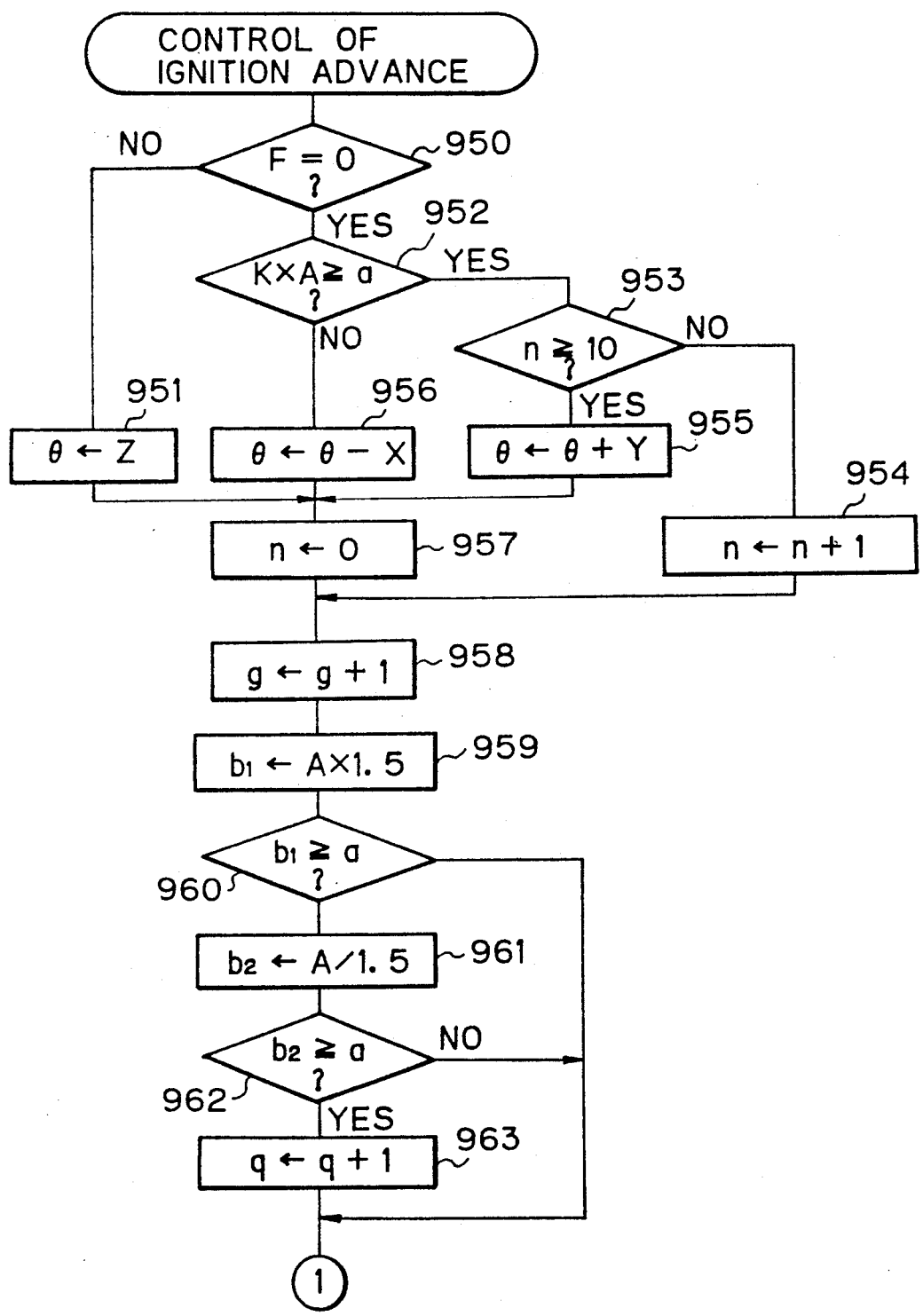
FIG. 14 and FIG. 15 are flow charts of another embodiment of control of the ignition advance.
Figure 15:
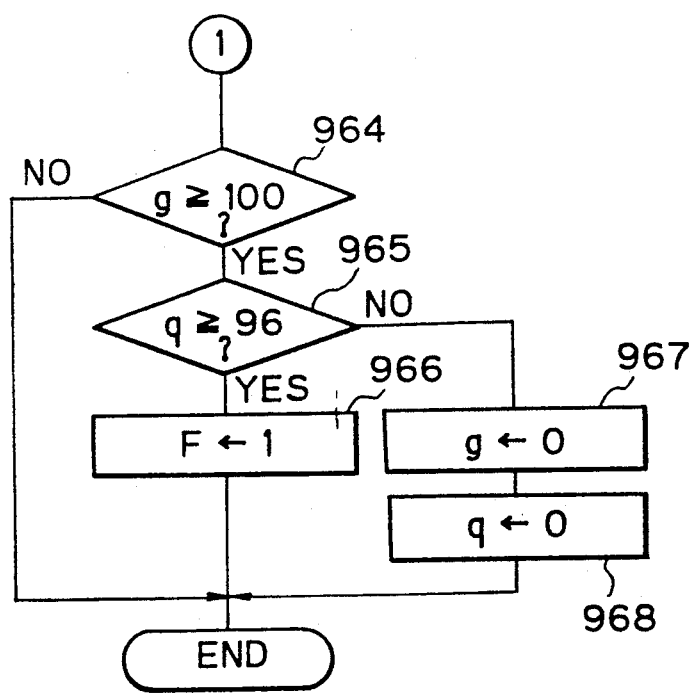
Figure 16A:
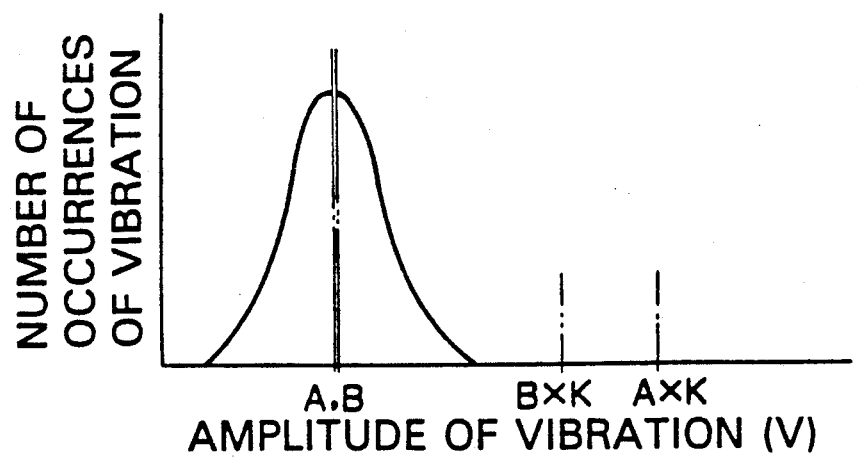
FIGS. 16A-16C are a diagram showing the frequency of occurrence of vibration.
Figure 16B:
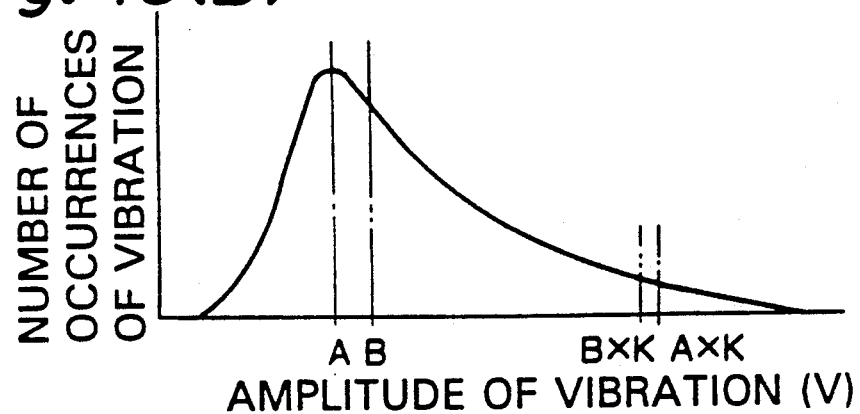
Figure 16C:
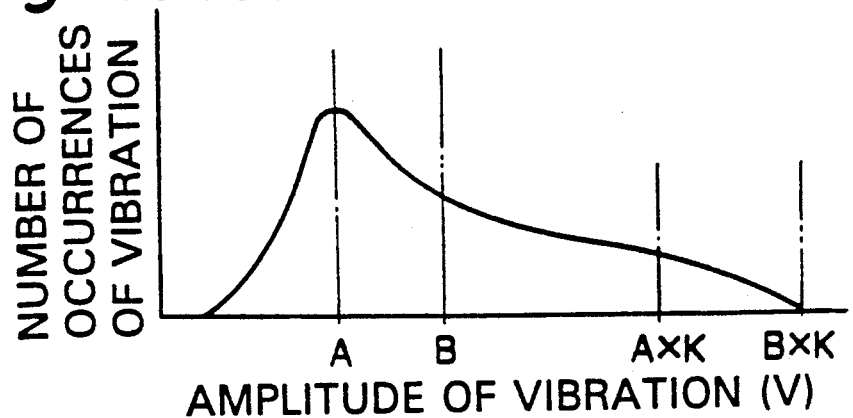

FIG. 11 shows a fifth embodiment of the processing for updating the maximum frequency point. The difference between this fifth embodiment and the fourth embodiment shown in FIG. 10 is just that the processing for control of the ignition advance is inserted before the step 830 in the fifth embodiment. Therefore, an explanation will be omitted of steps other than the processing for control of the ignition advance in FIG. 11. In the processing for control of the ignition advance of FIG. 11, in addition to the control of the ignition advance, diagnosis is performed on the knocking control apparatus. A first embodiment of the processing for control of the ignition advance is shown in FIG. 12, and a second embodiment is shown in FIG. 14 and FIG. 15. Therefore, the first embodiment and second embodiment will be explained with reference to FIG. 12, FIG. 14, and FIG. 15.

First, explaining the first embodiment shown in FIG. 12, the processing for control of the ignition advance includes a portion of control of the ignition advance (steps 900 to 907) and a portion of diagnosis of the knocking control apparatus (steps 908 to 915).

Referring to FIG. 12, first, at step 900, it is judged if an abnormality judgement flag F showing an abnormality in the knocking control apparatus is the value 0. If the judgement at step 900 is affirmative, that is, if it is judged that the knocking control apparatus is normal, the control proceeds to step 902, while if the judgement is negative, i.e., that it is not normal, the control proceeds to step 901. At step 901, the advance $\theta$ of the ignition timing is designated as the fixed value Z and then the control proceeds to step 908.

On the other hand, at step 902, it is judged if knocking signal amplitude a is less than the knocking determination level $k \times A$ for judging if knocking has occurred, that it, if knocking has occurred or not. If it is judged that knocking has not occurred, the control proceeds to step 903, while if it is judged that knocking has occurred, the control proceeds to step 906.

At step 903, it is judged if the count of the counter n for counting the number of successive states of no knocking is 10 or more. If the judgement at step 903 is affirmative, the control proceeds to step 905, while if the judgement is negative, the control proceeds to step 904. When the number of states of no knocking is less than 10, then at step 904 processing is performed to add the value 1 to the count of the counter n, then the control proceeds to step 908.

On the other hand, if the number of states of no knocking is 10 or more, the control proceeds to step 905, where processing is performed to increase the advance correction $\theta$ of the ignition timing by the crank angle Y, that is, processing is performed for advancing the ignition timing. Next, at step 907, processing is performed to reset the counter n to the value 0, then the control proceeds to step 908.

On the other hand, when knocking has occurred, the control proceeds to step 906, where processing is performed to decrease the advance correction $\theta$ of the ignition timing by the crank angle X, that is, processing is performed to delay the ignition timing. This processing suppresses the occurrence of knocking. After this, the control proceeds through step 907 to step 908.

From step 908 on, diagnosis of the knocking control apparatus is performed, as explained earlier.

Figure 13A:
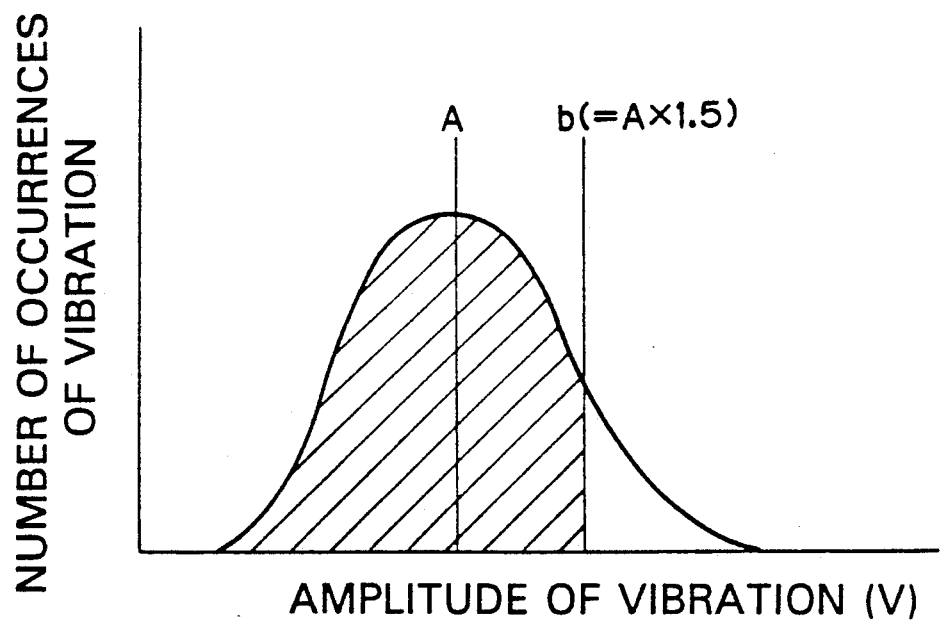
FIGS. 13A and 13B are a diagram showing the frequency of occurrence of vibration.
Figure 13B:
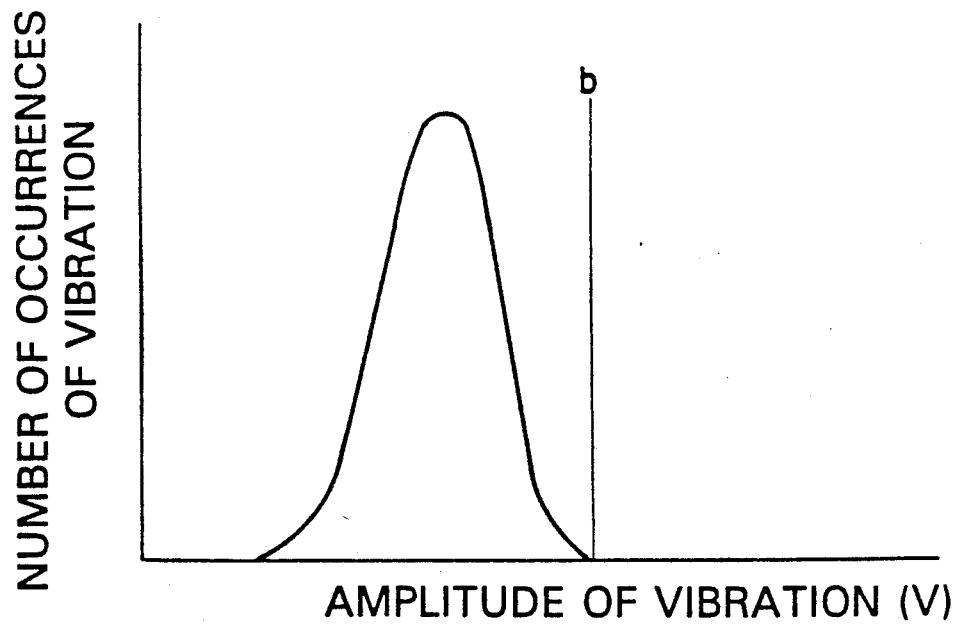

This diagnosis sets a boundary value b ($=A \times 1.5$) where the vibration amplitude becomes larger than the maximum frequency point A, as shown in FIG. 13(A), and judges that an abnormality has occurred in the knocking control apparatus when the number of occurrences of vibration with a vibration amplitude smaller than the boundary value b, that is, the number of occurrences of vibration with a vibration amplitude in the region shown by the hatching in FIG. 13(A), is larger than usual. That is, the distribution of the frequency of occurrence of vibration usually should be the distribution shown in FIG. 13(A) and if the distribution of the frequency of occurrence of vibration becomes a narrower range such as shown in FIG. 13(B), it is judged that there is an abnormality in the knocking control apparatus.

Returning again to FIG. 12, first, at step 908, the value of the maximum frequency point A multiplied by the coefficient 1.5 is set as the boundary value b. Next, at step 909, it is judged if the boundary value b is larger than a vibration amplitude corresponding to the predetermined voltage (for example, 10 mV . If the judgement at step 909 is affirmative, the control proceeds to step 911, while if the judgement is negative, the control proceeds to step 910 and 10 is set for the boundary value b.

At step 911, it is judged if the boundary value b is lower than the knocking signal amplitude a, that is, if the knocking signal amplitude a appears at a voltage side larger than the region shown by the hatching in FIG. 13(A). If the judgement at step 911 is affirmative, the control proceeds to step 912, where the value 0 is set for the counter q and the processing is ended. On the other hand, if it is judged that the knocking signal amplitude a is in the region shown by hatching in FIG. 13(A), the control proceeds to step 913, where processing is performed to add the value q to the counter q and then the control proceeds to step 914. That is, the counter q counts the times of appearance of the knocking signal amplitude a in the hatched region of FIG. 13(A).

At step 914, it is judged if the counter q is larger than the value 25. If it is judged larger, the control proceeds to step 915, where the value 1 is set for the abnormality judgement flag F.

That is, in step 911 to step 915, if the knocking signal amplitude a occurs consecutively 25 times in the hatched region of FIG. 13(A), it is considered that the distribution of the frequency of occurrence of vibration has become smaller, as shown in FIG. 13(B), so it is judged that the knocking control apparatus is abnormal. On the other hand, if a knocking signal amplitude a outside the hatched region of FIG. 13(A) appears even once during 25 measurements, that is, if knocking signal amplitude a appears outside of the hatched region of FIG. 13(A) 4 percent or more of the times, it is deemed that the distribution of frequency has become the normal distribution and it is judged that the knocking control apparatus is normal. Note that the reason why 10 is set for the boundary value b at step 910 when it is judged at step 909 that b<10 is that A=0 when the A/D value a is 0, so A×1.5=0 and b=0, therefore with the knocking signal amplitude a=0, the counter q would become the value 0 at all times and trouble cannot be detected. That is, if the knocking sensor 31, the peak hold circuit 3j, etc. break down and the knocking signal amplitude a becomes zero, it is judged at step 911 that b>a, so the abnormality flag F is set.

Further, if the peak hold circuit 3j etc. breaks and a constant voltage continues to be output by the peak hold circuit 3j, that is, if the knocking signal amplitude a becomes constant, a=A, so it is judged that b>a and the abnormality flag is set.

Next, an explanation will be given of the second embodiment shown in FIG. 14 and FIG. 15. The processing for control of the ignition advance also includes a portion of control of the ignition advance (steps 950 to 957) and a portion of diagnosis of the knocking control apparatus (steps 958 to 968).

Referring to FIG. 14 and FIG. 15, first, at step 950, it is judged if an abnormality judgement flag F showing an abnormality in the knocking control apparatus is the value 0. If the judgement at step 950 is affirmative, that is, if it is judged that the knocking control apparatus is normal, the control proceeds to step 952, while if the judgement is negative, i.e., that it is not normal, the control proceeds to step 951. At step 951, the advance $\theta$ of the ignition timing is designated as the fixed value Z and then the control proceeds to step 958.

On the other hand, at step 952, it is judged if knocking signal amplitude a is less than the knocking determination level k×A for judging if knocking has occurred, that is, if knocking has occurred or not. If it is judged that knocking has not occurred, the control proceeds to step 953, while if it is judged that knocking has occurred, the control proceeds to step 956.

At step 953, it is judged if the count of the counter n for counting the number of successive states of no knocking is 10 or more. If the judgement at step 953 is affirmative, the control proceeds to step 955, while if the judgement is negative, the control proceeds to step 954. When the number of states of no knocking is less than 10, then at step 954 processing is performed to add the value 1 to the count of the counter n, then the control proceeds to step 958.

On the other hand, if the number of states of no knocking is 10 or more, the control proceeds to step 955, where processing is performed to increase the advance correction $\theta$ of the ignition timing by the crank angle Y, that is, processing is performed for advancing the ignition timing. Next, at step 957, processing is performed to reset the counter n to the value 0, then the control proceeds to step 958.

On the other hand, when knocking has occurred, the control proceeds to step 956, where processing is performed to decrease the advance correction $\theta$ of the ignition timing by the crank angle X, that is, processing is performed to delay the ignition timing. This processing suppresses the occurrence of knocking. After this, the control proceeds through step 957 to step 958.

From step 958 on, diagnosis of the knocking control apparatus is performed, as explained earlier.

In the second embodiment, a boundary value b1 (=A×1.5) and a boundary value b2 (=A/1.5) are set at the two sides of the maximum frequency point A and it is judged that the knocking control apparatus is abnormal if the number of occurrences of vibration occurring between the boundary value b1 and the boundary value b2 is larger than normal.

Returning again to FIG. 14 and FIG. 15, first, at step 958, processing is performed to add the value 1 to the counter g for counting the total number of appearances of the knocking signal amplitude a, then at step 959 the maximum frequency point A is multiplied by the coefficient 1.5 and the boundary b1 of the large amplitude side is set.

Next, at step 960, it is judged if the boundary b1 is above the knocking signal amplitude a. If the judgement at step 960 is affirmative, the control proceeds to step 961, while if the judgement is negative, the control proceeds to step 964. At step 961, the value of the maximum frequency point A divided by the coefficient 1.5 is set as the boundary value b2 of the small amplitude side. Next, at step 962, it is judged if the boundary value b2 is below the knocking signal amplitude a. If the judgement is affirmative, the control proceeds to step 963, where processing is performed to add the value 1 to the counter q, while if the judgement is negative, the control proceeds to step 964.

That is, in step 960 to step 963, the frequency of occurrence q of vibration occurring between the boundary value b1 and the boundary value b2 is found.

Next, at step 964, it is judged if the counter g is 10 or more. If the judgement at step 964 is affirmative, the control proceeds to step 965, while if the judgement is negative, the processing cycle is ended. At step 965, it is judged if the counter q is 96 or more. If the judgement at step 965 is affirmative, the control proceeds to step 966, while if the judgement is negative, the control proceeds to step 967. That is, by the processing of step 964 and 965, it is judged if the knocking signal amplitude a has appeared with a probability of 96/100 or more between the boundary values b1 and b2. When it is judged that the knocking signal amplitude a has appeared at the above probability, the control proceeds to step 966, where the value 1 is set for the abnormality judgement flag F showing the knocking control apparatus is abnormal. On the other hand, at step 967, the value 0 is set in the counter g so as to start the count from the beginning, then at step 968 the value 0 is similarly set in the counter q.

As explained above, in the second embodiment, when the knocking signal amplitude a appears at a probability of 96 times out of 100 or more, that is, 96 percent or more, between the boundary values b1 and b2, it is judged that the knocking control apparatus is abnormal. In the second embodiment, if the knocking sensor 31, peak hold circuit 3j, and the like break down, the knocking signal amplitude a becomes zero, so A becomes zero and both b1 and b2 become zero, so the control proceeds from step 960 through steps 961 and 962 to step 963. Therefore, at step 965, it is judged that q≧96, so the abnormality flag F is set. Further, if the peak hold circuit 3j etc. breaks and the peak hold circuit 3j continues to output a constant vibration, that is, if the knocking signal amplitude a becomes constant, a=A, so in this case too, the control proceeds from step 960 through steps 961 and 962 to step 963. Therefore, at step 965, it is judged that q≧96, so the abnormality flag F is set.

While the invention has been described by reference to specific embodiments chosen for purposes of illustration, it should be apparent that numerous modifications could be made thereto by those skilled in the art without departing from the basic concept and scope of the invention.

I claim:

1. A knocking control apparatus comprising:
    detection means for detecting the strength of vibrations generated by an engine in a predetermined range of crank angle;
    updating means for updating a maximum frequency point, said maximum frequency point occurring at that strength of engine vibration generated most frequently by the engine in said predetermined range of crank angle;
    level setting means for setting a knocking determination level based on said maximum frequency point; and
    judgement means for judging that knocking has occurred when the maximum strength of vibration occurring in the engine exceeds said knocking determination level, a first region of a predetermined fixed width being set at the side of the larger strength of vibration of the maximum frequency point, a second region which has the same width as the first region being set at the side of the smaller strength of vibration of the said maximum frequency point, said updating means increasing the said maximum frequency point by a predetermined correction when the maximum strength of vibration occurring in the engine is in said first region and decreasing said maximum frequency point by said predetermined correction when the maximum strength of vibration occurring in the engine is in said second region.

2. A knocking control apparatus as set forth in claim 1, wherein said updating means does not update the maximum frequency point when the maximum strength of the vibration occurring in the engine is larger than said first region or smaller than said second region.

3. A knocking control apparatus as set forth in claim 1, wherein said correction is a fixed amount.

4. A knocking control apparatus as set forth in claim 1, wherein provision is made of mean frequency value updating means for updating the mean frequency value so that the mean frequency value matches a mean value of a frequency of occurrence of maximum strength of vibration generated by the engine and level setting means for setting the knocking determination level based on said mean frequency value; said mean frequency value updating means increases the mean frequency value when the maximum strength of vibration occurring at the engine is larger than said mean frequency value and decreases the mean frequency value when the maximum strength of vibration occurring at the engine is smaller than said mean frequency value; and said judgement means judges that knocking occurs when the maximum strength of vibration occurring in the engine exceeds either the knocking determination level based on the maximum frequency point or the knocking determination level based on the mean frequency value, whichever is lower.

5. A knocking control apparatus as set forth in claim 1, wherein provision is made of mean frequency value updating means for updating the mean frequency value so that the mean frequency value matches a mean value of a frequency of occurrence of maximum strength of vibration generated by the engine; said mean frequency value updating means increases the mean frequency value when the maximum strength of vibration occurring at the engine is larger than said mean frequency value and decreases the mean frequency value when the maximum strength of vibration occurring at the engine is smaller than said mean frequency value; and said updating means for updating the maximum frequency point increases the maximum frequency point when said mean frequency value is increased and decreases the maximum frequency point when the said mean frequency value is decreased.

6. A knocking control apparatus as set forth in claim 5, wherein provision is made of level setting means for setting the knocking determination level based on said mean frequency value; and said judgement means judges that knocking occurs when the maximum strength of vibration occurring in the engine exceeds either the knocking determination level based on the maximum frequency point or the knocking determination level based on the mean frequency value, whichever is lower.

7. A knocking control apparatus as set forth in claim 1, wherein said updating means increases the maximum frequency point by a fixed updating amount when the maximum strength of vibration occurring at the engine is larger than said first region and decreases said maximum frequency point by a fixed updating amount when the maximum strength of vibration occurring at the engine is smaller than said second region and wherein said updating amount is smaller than said correction.

8. A knocking control apparatus as set forth in claim 1, wherein provision is made of means for detecting a rate of change of the engine rotational speed; said updating means increases the maximum frequency point by a first updating amount when the maximum strength of vibration occurring at the engine is larger than said first region and decreases said maximum frequency point by a second updating amount when the maximum strength of vibration occurring at the engine is smaller than said second region; and said first updating amount and said second updating amount are reduced along with the reduction in the rate of change of the engine rotational speed.

9. A knocking control apparatus as set forth in claim 8, wherein said first updating amount and said second updating amount become smaller than even the correction when the rate of change of the engine rotational speed becomes lower than a predetermined rate of change.

10. A knocking control apparatus as set forth in claim 1, wherein provision is made of means for detecting the rate of change of the engine rotational speed and guard value control means for controlling a guard value so that the guard value increases along with the rise in the rate of change of the engine rotational speed; said updating means increases the maximum frequency point by a first updating amount when the maximum strength of vibration occurring at the engine is larger than said first region and decreases said maximum frequency point by a second updating amount when the maximum strength of vibration occurring at the engine is smaller than said second region; said first updating amount and said second updating amount are controlled so that they do not exceed the guard value; and said first updating amount and said second updating amount are proportional to the difference between the maximum strength of vibration occurring in the engine and the maximum frequency point in that controlled range.

11. A knocking control apparatus as set forth in claim 10, wherein said guard value control means increases the guard value in proportion to the rate of increase of the rate of change of the engine rotational speed when the rate of change of the engine rotational speed becomes larger and decreases said guard value in proportion to the rate of decrease of the rate of change of the engine rotational speed when the rate of change of the engine rotational speed becomes smaller.

12. A knocking control apparatus as set forth in claim 10, wherein when said first updating amount and said second updating amount exceed said guard value, said first updating amount and said second updating amount are made said guard value.

13. A knocking control apparatus as set forth in claim 10, wherein said first updating amount is equal to said second updating amount.

14. A knocking control apparatus as set forth in claim 10, wherein when said rate of change of the engine rotational speed becomes lower than a predetermined rate of change, said first updating amount and said second updating amount are restricted to amounts smaller than the correction by the said guard value.

15. A knocking control apparatus as set forth in claim 10, where said first updating amount is equal to said second updating amount and the correction is the sum of the said updating amount and a constant.

16. A knocking control apparatus as set forth in claim 10, wherein said first updating amount and said second updating amount are smaller than the difference between the maximum strength of vibration occurring in the engine and said maximum frequency point.

17. A knocking control apparatus as set forth in claim 1, wherein provision is made of means for calculating the rate of occurrence of engine vibration having said maximum strength of vibration under an upper boundary value larger than said maximum frequency point and it is judged that the knocking control apparatus is abnormal when said rate exceeds a predetermined rate.

18. A knocking control apparatus as set forth in claim 17, wherein said upper boundary value is a value of said maximum frequency point multiplied by a constant.

19. A knocking control apparatus as set forth in claim 17, wherein provision is made of means for controlling the amount of advance of ignition timing and said advance is fixed to a predetermined advance when there is an abnormality in the knocking control apparatus.

20. A knocking control apparatus as set forth in claim 1, wherein provision is made of means for calculating the rate of occurrence of engine vibration having said maximum strength of vibration under an upper boundary value larger than said maximum frequency point and above a lower boundary value smaller than said maximum frequency point and it is judged that the knocking control apparatus is abnormal when said rate exceeds a predetermined rate.

21. A knocking control apparatus as set forth in claim 20, wherein said upper boundary value is a value of said maximum frequency point multiplied by a constant and said lower boundary value is a value of said maximum frequency point divided by a constant.

22. A knocking control apparatus as set forth in claim 20, wherein provision is made of means for controlling the amount of advance of ignition timing and said advance is fixed to a predetermined advance when there is an abnormality in the knocking control apparatus.

23. A knocking control apparatus as set forth in claim 1, wherein said detection means is provided with a single knocking sensor mounted on the engine.

24. A knocking control apparatus as set forth in claim 1, wherein the maximum strength of vibration occurring in the engine is detected in the form of voltage and said updating means updates said maximum frequency point so that the maximum frequency point matches with the voltage with the highest frequency of occurrence.

25. A knocking control apparatus as set forth in claim 1, wherein said knocking determination level is a value of said maximum frequency point multiplied by a constant.

26. A knocking control apparatus as set forth in claim 1, wherein provision is made of means for controlling the advance of the ignition timing and the amount of advance is decreased when it is judged by said judgement means that knocking is occurring.

27. A knocking control apparatus as set forth in claim 26, wherein said judgement means judges if knocking is occurring at every predetermined timing and the amount of advance is increased when it is judged by said judgement means that knocking has occurred consecutively a predetermined number of times.

* * * * *

UNITED STATES PATENT AND TRADEMARK OFFICE
CERTIFICATE OF CORRECTION

PATENT NO. : 5,062,402

DATED : November 5, 1991

INVENTOR(S) : Takeda

It is certified that error appears in the above-identified patent and that said Letters Patent is hereby corrected as shown below:

Column 5    line 21, change "1" to --1--;
            line 22, change "2", "3" and "4" to --2--, --3-- and --4--;
            line 52, change "3b" to --3h--;

Column 10   line 2, delete "is judged";

Column 12   line 18, change "f" to --from--;

Signed and Sealed this

Thirty-first Day of May, 1994

BRUCE LEHMAN

Attest:

*Attesting Officer*     *Commissioner of Patents and Trademarks*